(12) United States Patent
Ullah

(10) Patent No.: US 7,856,372 B2
(45) Date of Patent: *Dec. 21, 2010

(54) TARGETING CONTENT TO INTERNET ENABLED RADIO DEVICES

(76) Inventor: Shah Ullah, 35 Battery Ave., Brooklyn, NY (US) 11228

( * ) Notice: Subject to any disclaimer, the term of this patent is extended or adjusted under 35 U.S.C. 154(b) by 179 days.

This patent is subject to a terminal disclaimer.

(21) Appl. No.: 11/926,011

(22) Filed: Oct. 28, 2007

(65) Prior Publication Data
US 2008/0133332 A1  Jun. 5, 2008

Related U.S. Application Data

(63) Continuation of application No. 11/855,820, filed on Sep. 14, 2007.

(60) Provisional application No. 60/825,708, filed on Sep. 14, 2006.

(51) Int. Cl.
*G06Q 10/00* (2006.01)
(52) U.S. Cl. ......................... 705/10; 705/14.4
(58) Field of Classification Search .................. 705/10
See application file for complete search history.

(56) References Cited

U.S. PATENT DOCUMENTS

| | | | | |
|---|---|---|---|---|
| 5,848,396 | A * | 12/1998 | Gerace | 705/10 |
| 6,484,148 | B1 * | 11/2002 | Boyd | 705/14.64 |
| 6,710,815 | B1 | 3/2004 | Billmaier et al. | |
| 6,898,762 | B2 * | 5/2005 | Ellis et al. | 715/716 |
| 6,990,635 | B2 * | 1/2006 | Kurapati et al. | 715/747 |
| 7,187,947 | B1 | 3/2007 | White et al. | |
| 7,227,475 | B1 * | 6/2007 | Provenzano et al. | 340/995.24 |
| 7,254,367 | B2 | 8/2007 | Helden et al. | |
| 7,283,803 | B2 | 10/2007 | Karaoguz et al. | |
| 7,343,317 | B2 * | 3/2008 | Jokinen et al. | 705/14 |
| 2002/0055924 | A1 | 5/2002 | Liming | |
| 2002/0104087 | A1 * | 8/2002 | Schaffer et al. | 725/46 |
| 2002/0138848 | A1 * | 9/2002 | Alao et al. | 725/109 |
| 2003/0014307 | A1 * | 1/2003 | Heng | 705/14 |
| 2003/0032409 | A1 * | 2/2003 | Hutcheson et al. | 455/414 |
| 2003/0208754 | A1 * | 11/2003 | Sridhar et al. | 725/34 |
| 2004/0005900 | A1 * | 1/2004 | Zilliacus | 455/466 |
| 2005/0080665 | A1 | 4/2005 | Bowman-Amuah | |

(Continued)

FOREIGN PATENT DOCUMENTS

WO  WO-2008034072 A2  3/2008
WO  WO-2008034072 A3  3/2008

OTHER PUBLICATIONS

"Context-aware middleware for mobile multimedia applications" psu.edu, O Davidyuk, J Riekki, VM Rautio, J . . . —. . . conference on Mobile and . . . , 2004—portal.acm.org.*

(Continued)

*Primary Examiner*—Jonathan G Sterrett
(74) *Attorney, Agent, or Firm*—Strategic Patents, PC

(57) ABSTRACT

Methods and systems are disclosed herein for managing content, including advertising content, delivered to various network-connected devices, including screens, mobile devices, computers, televisions, radios, and the like, based on usage profiles associated with device-specific identifiers for mobile devices, short-distance wireless technologies for transmission of content and detection of proximity, and content targeting and management techniques.

18 Claims, 33 Drawing Sheets

U.S. PATENT DOCUMENTS

| | | | |
|---|---|---|---|
| 2005/0120389 A1* | 6/2005 | Boss et al. | 725/135 |
| 2005/0278716 A1 | 12/2005 | Koppen et al. | |
| 2006/0022048 A1 | 2/2006 | Johnson | |
| 2006/0165060 A1 | 7/2006 | Dua | |
| 2006/0173974 A1 | 8/2006 | Tang | |
| 2006/0271997 A1* | 11/2006 | Jacoby et al. | 725/135 |
| 2007/0201376 A1 | 8/2007 | Marshall | |
| 2008/0108308 A1 | 5/2008 | Ullah | |
| 2008/0109888 A1 | 5/2008 | Ullah | |
| 2008/0133327 A1 | 6/2008 | Ullah | |
| 2008/0220760 A1 | 9/2008 | Ullah | |

OTHER PUBLICATIONS

Implementing location based information/advertising for existing mobile phone users in . . . —lancs.ac.uk [PDF] O Rashid, P Coulton, R Edwards—Mobile Business, 2005. ICMB 2005. International . . . , 2005—ieeexplore.ieee.org.*

A survey of mobility management in next-generation all-IP-based wireless systems—gatech.edu [PDF] IF Akyildiz, J Xie, S Mohanty—IEEE Wireless Communications, 2004—ieeexplore.ieee.org.*

Location-based Services in the tourist industry S Berger, H Lehmann, F Lehner—Information Technology & Tourism, 2003—tourism.wu-wien.ac.at.*

Matching User's Semantics with Data Semantics in Location-Based Services S Yu, L Al-Jadir, S Spaccapietra—1st Workshop on Semantics in mobile Environments—lbdsun.epfl.ch.*

"The cricket location-support system" NB Priyantha, A Chakraborty, H Balakrishnan—Proceedings of the 6th annual international . . . , 2000—portal.acm.org.*

A survey of context-aware mobile computing research psu.edu [PDF] G Chen, D Kotz—2000—Citeseer.*

"The impact and penetration of location-based services", N Shiode, C Li, M Batty, P Longley, D Maguire—Telegeoinformatics: location-based computing . . . , 2004—casa.ucl.ac.uk.*

"Composite device using distributed MVC architecture" SS Hansen—daimi.au.dk 2005.*

Development of a Residential Gateway and a Service Server for Home Automation Jongkyu Park, et al. Lecture Notes in Computer Science Publisher Springer Berlin / Heidelberg, ISSN 0302-9743 (Print) 1611-3349 (Online) vol. 2402/2002, Advanced Internet Services and Applications, Copyright 2002.*

Diomidis D. Spinellis, The information furnace: consolidated home control, Personal and Ubiquitous Computing, v.7 n. 1, p. 53-69, May 2003.*

A relative positioning system for co-located mobile devices M Hazas, C Kray, H Gellersen, H Agbota, G . . . —usenix.org.*

Application requirements for middleware for mobile and pervasive systems K Raatikainen, HB Christensen, T Nakajima—ACM Sigmobile Mobile Computing and . . . , 2002—portal.acm.org.*

Composite device computing environment: A framework for situated interaction using small screen devices TL Pham, G Schneider, S Goose, A Pizano—Personal and Ubiquitous Computing, 2001—Springer.*

Opportunistic annexing for handheld devices: Opportunities and challenges JS Pierce, H Mahaney, G Abowd—Proceedings of HCIC, 2004—Citeseer.*

An Analysis of the Usage of Mobile Phones for Personalized Interactions with Ubiquitous Public Displays E Rukzio, A Schmidt, H Hussmann—. . . Ubiquitous Display Environments in conjunction with . . . , 2004—Citeseer.*

"U.S. Appl. No. 11/855,122, Non-Final Office Action mailed Dec. 24, 2009", , 7 pgs.

ISA, "International Search Report", For US Patent Application No. PCT/US07/78519, mailed on May 15, 2008 Apr. 2, 2008.

McCune, J. M. , "Seeing-Is-Believing: Using Camera Phones for Human-Verifiable Authentication", *Proceedings of the 2005 IEEE Symposium on security and privacy* May 2005 , 110-124.

"U.S. Appl. No. 11/855,685, Non-Final Office Action mailed Aug. 31, 2010", ,23.

"U.S. Appl. No. 11/855,811, Non-Final Office Action mailed Jul. 22, 2010", , 20 pgs.

* cited by examiner

TARGETING CONTENT TO INTERNET ENABLED RADIO DEVICES

CROSS-REFERENCE TO RELATED APPLICATIONS

This application claims the benefit of the following provisional application, which is hereby incorporated by reference in its entirety: U.S. Provisional App. No. 60/825,708 filed Sep. 14, 2006.

BACKGROUND

1. Field

The methods and systems herein described relate to mobile device identification and authentication for access to and presentation of targeted content.

2. Description of the Related Art

Methods and systems exist for targeting content, including advertising content, directed to users of network-connected devices, such as televisions, mobile handsets, computers, radios, advertising screens and the like. Such content-targeting methods face various challenges, depending on the users and devices to which content is targeted. For example, television and radio advertisements are often directed to a mass audience, with little information about specific users. Internet advertisements may be based on cookies or similar mechanisms that indicate that a user is returning to a particular site, but targeting based on cookies and similar information are subject to limitations, among them being that multiple users may access the Internet through the same device. Mobile content may be targeted more easily to a specific user, such as based on information about the user in a database maintained by a wireless carrier or based on the user's interaction with content on the mobile handset, but the more limited range of content that can be delivered to mobile devices means that profiles based on that usage are often limited and sometimes misleading. Accordingly, a need exists for better methods of targeting content to users of all types of network-connected devices.

SUMMARY

Methods and systems are disclosed herein for delivering content, including advertising content, to various network-connected devices. In various embodiments disclosed herein, methods and systems take advantage of capabilities and information available in various networking domains to deliver more targeted content to each of those domains, including using the collective capabilities and information derived from multiple domains to deliver content to each domain.

One embodiment of the methods and systems disclosed herein relates to television content and advertising. In certain such embodiments a user profile may be derived from an individual's usage of a range of different types of network-connected devices, and the profile may be used to target television content, including advertisements, to the user. The network-connected devices from which usage profiles are derived may include mobile phones, computers, Internet-connected entertainment devices (such as Internet-connected televisions and radios) and other devices. Capabilities of mobile handset technologies may be used to unify a profile of a user across various network-connected devices. In embodiments, a device-specific identifier (DSI) of a mobile device owned by a user, such as a MAC address of the user's mobile phone, may be associated with user names that the user enters when interacting with network content, such as web sites, using that mobile device. Once the DSI is associated with one or more user names, activities associated with those user names can be tracked and used to generate a profile for that user, regardless of what network-connected device is used to undertake the activities. Additionally, when a user interacts with network content using various network-connected devices and does not enter a username, activity performed during those sessions may still be categorized into profiles as the device-specific identifier of the device through which the interactivity was performed is still recorded. As such activity may be derived from more than one user of the same device, patterns in activity performed on such devices without the accompaniment of a username may be conducted to find similarities among the network activity recorded containing both a DSI and username or to find similarities particularly to the network activity conducted on the user's mobile device as it is the most individual-specific network-connected device. Furthermore, when a user interacts with network content using a given network-connected device and does not enter a username, but during the same session of activity, on the same given network-connected device, as determined by proximity of access times, interacts with a second set of network content with a supplement of a username, activity performed with the first instance of network content, which was not supplemented with a username may be associated with activity performed with the second set of network content which was supplemented with a username, thus allowing activity performed with two unique sets of network content, one with a username, one without a username, to be categorized under the same profile of user activity. Thus, a multi-device profile may be created for that user, such that activity on a network performed on a network-connected device whether accompanied by a username or not, can still be categorized into a single profile for a user which represents a wide range of activities across multiple devices and domains. Once a usage profile is generated, targeting techniques, such as hand targeting, demographic targeting, geographic targeting, psychographic targeting, collaborative filtering, neural network-based targeting, hierarchical targeting, and the like may be used to target content, including advertisements, to be directed to the television of the user. In embodiments, use of short-distance wireless technologies supports more specific targeting of content to a user or a group of users and enables digital rights management, security and content management. In particular, a short-distance wireless communication between a mobile handset and another network-enabled device, such as using a Bluetooth, WiFi, WUSB, UWB or other wireless protocol, allows the methods and systems disclosed herein, in certain embodiments, to determine or verify the proximity of the user's handset, and by inference the user, to the other network-enabled device. Thus, a user's proximity to a television screen can be determined by using a short-distance wireless protocol to access the MAC address of the handset. Once proximity is determined or verified, it can be used for various purposes, including tracking what the user (or other nearby users) view on the television screen, such as for ratings purposes, managing (including with digital rights management techniques) the content the user is allowed to view on the screen (including allowing the user to share content from a user's library as long as the user's mobile handset is in proximity to the screen), and targeting the content directed to the user on the screen, including advertising, for which a user-specific profile which includes the activities performed on a multitude of network-connected devices may be referenced. Thus, the methods and systems disclosed herein allow for user-specific control of content delivered to the screen the user is watching, based on proximity of the user's mobile handset to the screen.

Another embodiment of the methods and systems disclosed herein relates to radio advertising. In certain such embodiments a user profile may be derived from an individual's usage of a range of different types of network-connected devices, and the profile may be used to target audio content, including advertisements, to the user. As in other embodiments, the network-connected devices from which usage profiles are derived may include mobile phones, computers, Internet-connected entertainment devices (such as Internet-connected televisions and radios) and other devices. Capabilities of mobile handset technologies may be used to unify a profile of a user across various network-connected devices. In embodiments, a device-specific identifier (DSI) of a mobile device owned by a user, such as a MAC address of the user's mobile phone, may be associated with user names that the user enters when interacting with network content, such as web sites, using that mobile device. Once the DSI is associated with one or more user names, activities associated with those user names can be tracked and used to generate a profile for that user, regardless of what network-connected device is used to undertake the activities. Additionally, when a user interacts with network content using various network-connected devices and does not enter a username, activity performed during those sessions may still be categorized into profiles as the device-specific identifier of the device through which the interactivity was performed is still recorded. As such activity may be derived from more than one user of the same device, patterns in activity performed on such devices without the accompaniment of a username may be conducted to find similarities among the network activity recorded containing both a DSI and username or to find similarities particularly to the network activity conducted on the user's mobile device as it is the most individual-specific network-connected device. Furthermore, when a user interacts with network content using a given network-connected device and does not enter a username, but during the same session of activity, on the same given network-connected device, as determined by proximity of access times, interacts with a second set of network content with a supplement of a username, activity performed with the first instance of network content, which was not supplemented with a username may be associated with activity performed with the second set of network content which was supplemented with a username, thus allowing activity performed with two unique sets of network content, one with a username, one without a username, to be categorized under the same profile of user activity. Thus, a multi-device profile may be created for that user, such that activity on a network performed on a network-connected device whether accompanied by a username or not, can still be categorized into a single profile for a user which represents a wide range of activities across multiple devices and domains. Once a usage profile is generated, targeting techniques, such as hand targeting, demographic targeting, geographic targeting, psychographic targeting, collaborative filtering, neural network-based targeting, hierarchical targeting, and the like may be used to target content, including advertisements, to be directed to the audio-enabled devices, such as Internet radios, of the user. In embodiments, use of short-distance wireless technologies supports more specific targeting of content to a user or a group of users and enables digital rights management, security and content management. In particular, a short-distance wireless communication between a mobile handset and another network-enabled device, such as an Internet-radio, such as using a Bluetooth, WiFi, WUSB, UWB or other wireless protocol, allows the methods and systems disclosed herein, in certain embodiments, to determine or verify the proximity of the user's handset, and by inference the user, to the other network-enabled device. Thus, a user's proximity to an Internet radio can be determined by using a short-distance wireless protocol to access the MAC address of the handset. Once proximity is determined or verified, it can be used for various purposes, including tracking what the user (or other nearby users) listen to on the audio-enabled device, such as for ratings purposes, managing (including with digital rights management techniques) the content the user is allowed to listen to on the audio-enabled device (including allowing the user to share content from a user's library as long as the user's mobile handset is in proximity to the audio-enabled device), and targeting the content directed to the user on the audio-enabled device, including advertising. Thus, the methods and systems disclosed herein allow for user-specific control of content delivered to the audio-enabled device to which the user is listening, based on proximity of the user's mobile handset to the audio-enabled device.

Another embodiment of the methods and systems disclosed herein relates to point-of-presence content delivery, such as live event content delivery and point-of-sale advertising. In certain such embodiments a user profile may be derived from an individual's usage of a range of different types of network-connected devices, and the profile may be used to target point-of-presence content, including advertisements, to the user. As in other embodiments, the network-connected devices from which usage profiles are derived may include mobile phones, computers, Internet-connected entertainment devices (such as Internet-connected televisions and radios) and other devices. Capabilities of mobile handset technologies may be used to unify a profile of a user across various network-connected devices. In embodiments, a device-specific identifier (DSI) of a mobile device owned by a user, such as a MAC address of the user's mobile phone, may be associated with user names that the user enters when interacting with network content, such as web sites, using that mobile device. Once the DSI is associated with one or more user names, activities associated with those user names can be tracked and used to generate a profile for that user, regardless of what network-connected device is used to undertake the activities. Additionally, when a user interacts with network content using various network-connected devices and does not enter a username, activity performed during those sessions may still be categorized into profiles as the device-specific identifier of the device through which the interactivity was performed is still recorded. As such activity may be derived from more than one user of the same device, patterns in activity performed on such devices without the accompaniment of a username may be conducted to find similarities among the network activity recorded containing both a DSI and username or to find similarities particularly to the network activity conducted on the user's mobile device as it is the most individual-specific network-connected device. Furthermore, when a user interacts with network content using a given network-connected device and does not enter a username, however during the same session of activity, on the same given network-connected device, as determined by proximity of access times, interacts with a second set of network content with a supplement of a username, activity performed with the first instance of network content, which was not supplemented with a username may be associated with activity performed with the second set of network content which was supplemented with a username, thus allowing activity performed with two unique sets of network content, one with a username, one without a username, to be categorized under the same profile of user activity. Thus, a multi-device profile may be created for that user, such that activity on a network performed on a network-connected device whether accompanied by a username or not, can still be categorized into a single profile for a user which represents a wide range of activities across multiple devices and domains. Once a usage profile is generated, targeting techniques, such as hand targeting, demographic targeting, geographic targeting, psychographic targeting, collaborative filtering, neural network-based targeting, hierarchical targeting, and the like may be used to target content, including advertisements, to be directed to a point-of-presence device, such as a screen or audio-enabled device, that is in proximity to the user. In embodiments, use of short-distance wireless technologies supports more specific targeting of content to a user or a group of users and enables digital rights management, security and content management. In particular, a short-distance wireless communication between a mobile handset and another network-enabled device, such as using a Bluetooth, WiFi, WUSB, UWB or other wireless protocol, allows the methods and systems disclosed herein, in certain embodiments, to determine or verify the proximity of the user's handset, and by inference the user, to the other network-enabled device, in this case a point-of-presence device such as a screen at a live event, a point-of-sale screen, or a point-of-presence audio-enabled device. Thus, a user's proximity to such a point-of-presence device can be determined by using a short-distance wireless protocol to access the MAC address of the handset. Once proximity is determined or verified, it can be used for various purposes, including tracking what the user (or other nearby users) view on a screen or hear on an audio-enabled device, such as for ratings purposes, tracking the effectiveness of advertising, managing (including with digital rights management techniques) the content the user is allowed to view on the screen (including allowing the user to share content from a user's library as long as the user's mobile handset is in proximity to the screen), and targeting the content directed to the user on the screen, including advertising. Thus, the methods and systems disclosed herein allow for user-specific control of content delivered to the screen or audio-enabled device the user is watching, based on proximity of the user's mobile handset to the screen or audio-enabled device.

One embodiment of the methods and systems disclosed herein relates to Internet content. In certain such embodiments a user profile may be derived from an individual's usage of a range of different types of network-connected devices, and the profile may be used to target Internet content, including advertisements, to the user. The network-connected devices from which usage profiles are derived may include mobile phones, computers, Internet-connected entertainment devices (such as Internet-connected televisions and radios) and other devices. Capabilities of mobile handset technologies may be used to unify a profile of a user across various network-connected devices. In embodiments, a device-specific identifier (DSI) of a mobile device owned by a user, such as a MAC address of the user's mobile phone, may be associated with user names that the user enters when interacting with network content, such as web sites, using that mobile device. Once the DSI is associated with one or more user names, activities associated with those user names can be tracked and used to generate a profile for that user, regardless of what network-connected device is used to undertake the activities. Additionally, when a user interacts with network content using various network-connected devices and does not enter a username, activity performed during those sessions may still be categorized into profiles as the device-specific identifier of the device through which the interactivity was performed is still recorded. As such activity may be derived from more than one user of the same device, patterns in activity performed on such devices without the accompaniment of a username may be conducted to find similarities among the network activity recorded containing both a DSI and username or to find similarities particularly to the network activity conducted on the user's mobile device as it is the most individual-specific network-connected device. Furthermore, when a user interacts with network content using a given network-connected device and does not enter a username, however during the same session of activity, on the same given network-connected device, as determined by proximity of access times, interacts with a second set of network content with a supplement of a username, activity performed with the first instance of network content, which was not supplemented with a username may be associated with activity performed with the second set of network content which was supplemented with a username, thus allowing activity performed with two unique sets of network content, one with a username, one without a username, to be categorized under the same profile of user activity. Thus, a multi-device profile may be created for that user, such that activity on a network performed on a network-connected device whether accompanied by a username or not, can still be categorized into a single profile for a user which represents a wide range of activities across multiple devices and domains. Once a usage profile is generated, targeting techniques, such as hand targeting, demographic targeting, geographic targeting, psychographic targeting, collaborative filtering, neural network-based targeting, hierarchical targeting, and the like may be used to target content, including advertisements, to be directed to the Internet-connected device of the user. In embodiments, use of short-distance wireless technologies supports more specific targeting of content to a user or a group of users and enables digital rights management, security and content management. In particular, a short-distance wireless communication between a mobile handset and another network-enabled device, such as using a Bluetooth, WiFi, WUSB, UWB or other wireless protocol, allows the methods and systems disclosed herein, in certain embodiments, to determine or verify the proximity of the user's handset, and by inference the user, to the other network-enabled device. Thus, a user's proximity to an Internet-connected device can be determined by using a short-distance wireless protocol to access the MAC address or other DSI of the handset. Once proximity is determined or verified, it can be used for various purposes, including tracking what the user (or other nearby users) view on the Internet-connected device, such as for ratings purposes, managing (including with digital rights management techniques) the content the user is allowed to view or listen on the device (including allowing the user to share content from a user's library as long as the user's mobile handset is in proximity to the device), and targeting the content directed to the user on the device, including advertising. Thus, the methods and systems disclosed herein allow for user-specific control of content delivered to the screen the user is watching or the audio-device to which the user is listening, based on proximity of the user's mobile handset to the Internet-connected device.

One embodiment of the methods and systems disclosed herein relates to mobile advertising. In certain such embodiments a user profile may be derived from an individual's usage of a range of different types of network-connected devices, and the profile may be used to target television content, including advertisements, to the user. The network-connected devices from which usage profiles are derived may include mobile phones, computers, Internet-connected entertainment devices (such as Internet-connected televisions and radios) and other devices. Capabilities of mobile handset technologies may be used to unify a profile of a user across various network-connected devices. In embodiments, a device-specific identifier (DSI) of a mobile device owned by a user, such as a MAC address of the user's mobile phone, may be associated with user names that the user enters when interacting with network content, such as web sites, using that mobile device. Once the DSI is associated with one or more user names, activities associated with those user names can be tracked and used to generate a profile for that user, regardless of what network-connected device is used to undertake the activities. Additionally, when a user interacts with network content using various network-connected devices and does not enter a username, activity performed during those sessions may still be categorized into profiles as the device-specific identifier of the device through which the interactivity was performed is still recorded. As such activity may be derived from more than one user of the same device, patterns in activity performed on such devices without the accompaniment of a username may be conducted to find similarities among the network activity recorded containing both a DSI and username or to find similarities particularly to the network activity conducted on the user's mobile device as it is the most individual-specific network-connected device. Furthermore, when a user interacts with network content using a given network-connected device and does not enter a username, however during the same session of activity, on the same given network-connected device, as determined by proximity of access times, interacts with a second set of network content with a supplement of a username, activity performed with the first instance of network content, which was not supplemented with a username may be associated with activity performed with the second set of network content which was supplemented with a username, thus allowing activity performed with two unique sets of network content, one with a username, one without a username, to be categorized under the same profile of user activity. Thus, a multi-device profile may be created for that user, such that activity on a network performed on a network-connected device whether accompanied by a username or not, can still be categorized into a single profile for a user which represents a wide range of activities across multiple devices and domains. Once a usage profile is generated, targeting techniques, such as hand targeting, demographic targeting, geographic targeting, psychographic targeting, collaborative filtering, neural network-based targeting, hierarchical targeting, and the like may be used to target content, including advertisements, to be directed to the mobile device of the user. In embodiments, use of short-distance wireless technologies supports more specific targeting of content to a user or a group of users and enables digital rights management, security and content management. In particular, a short-distance wireless communication between a mobile handset and another network-enabled device, such as using a Bluetooth, WiFi, WUSB, UWB or other wireless protocol, allows the methods and systems disclosed herein, in certain embodiments, to determine or verify the proximity of the user's handset, and by inference the user, to another mobile device. Thus, a user's proximity to a mobile device can be determined by using a short-distance wireless protocol to access the MAC address or other DSI of the handset. Once proximity is determined or verified, it can be used for various purposes, including managing (including with digital rights management techniques) the content another user is allowed to access on another mobile device (including allowing the user to share content from a user's library as long as the user's mobile handset is in proximity to the other user's device), and targeting the content directed to the user on the other device, including advertising.

One advantage of the methods and systems herein is they enable a drastic improvement in the television advertising industry. There are certain technology and business drivers for a higher penetration of more advanced set-top boxes that may be associated with improvements in television advertising.

DVDs may become a technological non-necessity in a few years. Users will consume video via a direct feed/download. This video data will need to go through a data box in the home that routes not only video, but other data streams such as voice and Internet data inside the home. As a result, viewers that will not subscribe to premium television channels will likely have an advanced set-top box for the consumption of non-premium television channels and for watching movies.

Fixed-Mobile-Convergence (FMC) indicates that landlines may soon become a technological non-necessity. A device that switches a cell phone's connection from a cell-tower to the broadband connection inside the home (in the form of cable, satellite, Fixed WiMax, or other broadband connection) may become necessary. It is very reasonable to assume, especially with the triple and quadruple play packages being presented to consumers, that the features of such a device will eventually be embedded into the same unit that controls video downloads including television and movies.

Using the mobile device is potentially the only way to attain a real-time, live assessment of who is watching the television and tailor the advertisements delivered to the unique combinations of viewers. A father and son watching television content together represent two very unique advertising markets. To best take advantage of this blend of viewers simultaneously viewing television, for the purposes of accurate and proportional advertising, a device that is overwhelmingly individual specific such as the mobile handset may provide tremendous value.

Additionally, activity performed on a mobile handset as a portion of overall activity performed on a network-connected device, is increasing rapidly and will continue to do so in the foreseeable future.

For Internet publishers of websites, blogs, or for Internet retailers, the server-side software which facilitates the creation of user-specific profiles rooted in the mobile DSI but which also take into consideration all network-connected devices, is a technology that may but will not necessarily, provide the same value as a free advertising network for Internet websites, blog publishers, or Internet retailers allowing them access to the best available user-specific Internet usage metrics so they can serve the best possible ads on available ad inventory or in the case of an Internet retailer, promote the best products suited for visitors to the given Internet retailer's website. Based on the content, fees may be collected by a provider of a mobile DSI identification/authentication service, such as for video, unlimited viewing, extending the content on a given Internet platform to another platform such as television content, portable/flexible electronic screens used to make digital text portable, radio, and the like.

As a result of mobile carriers dealing with voice revenue decaying rapidly and as even the margins on data consumption are becoming hyper-competitive, mobile carriers are rapidly seeking ways to monetize their high penetration numbers through advertising. From business processes which rely upon the methods and systems disclosed herein, mobile carriers may receive a portion of advertising revenue from various sources of advertising, including television which accounts for 34% of all advertising dollars in the US or $72 billion in 2006. As video on the internet becomes more prevalent, advertising related revenue will only grow and through technological advances, television and internet advertising and content delivery will benefit.

Digital Rights Management synergies with content producers are enabled by the methods and systems herein. Content production companies such as News Corporation can enjoy digital rights management services to protect their premium content while using the methods and systems herein to aid in the serving of highly-precise, targeted ads, such as by using DSI based identification/authentication profiles.

Placing an emphasis on a mobile handset's device-specific identification (DSI) as a base for a user-specific profile generated from activity performed on various network-connected devices may be based on an understanding that it is essentially carried on a given user's person and thus is very individual-specific. Additionally, since it is carried on a given user's person, it follows the user in many places where other devices such as a PC/laptop might not, thus allowing user-specific profiles created with specific dependencies and ties to the mobile handset, to be portable by virtue of the inherent portability of mobile handset. Additionally, when attempting to aggregate all the Internet usage habits of a user across various devices, beginning with the mobile DSI may facilitate the aggregation by enabling the use of clues or information associated with the mobile handset DSI and the associated user to determine what other information, found as a result of Internet usage on other network-connected devices associated with the same user, to aggregate with it. Starting with a fixed position, or multi-user device, such as a PC, a television, or other stationary Internet-enabled device presents user identification challenges that the mobile handset does not. These challenges are mainly rooted on the basis that such devices may, and often, have multiple regular users. Therefore the mobile handset may serve as a primary identification device for a scenario in which the methods and systems herein (e.g. identification or authentication) could be applied for advertising, content/software as a service-authentication, and the like. The mobile handset is widely regarded as becoming the most frequently used computing interface, making it ideal for user authentication purposes. However, the methods and systems described herein do not all require a mobile component, and therefore, for the purposes of the unique methods and systems described herein, they can be associated with mechanisms that do include a mobile component.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Figure 1:
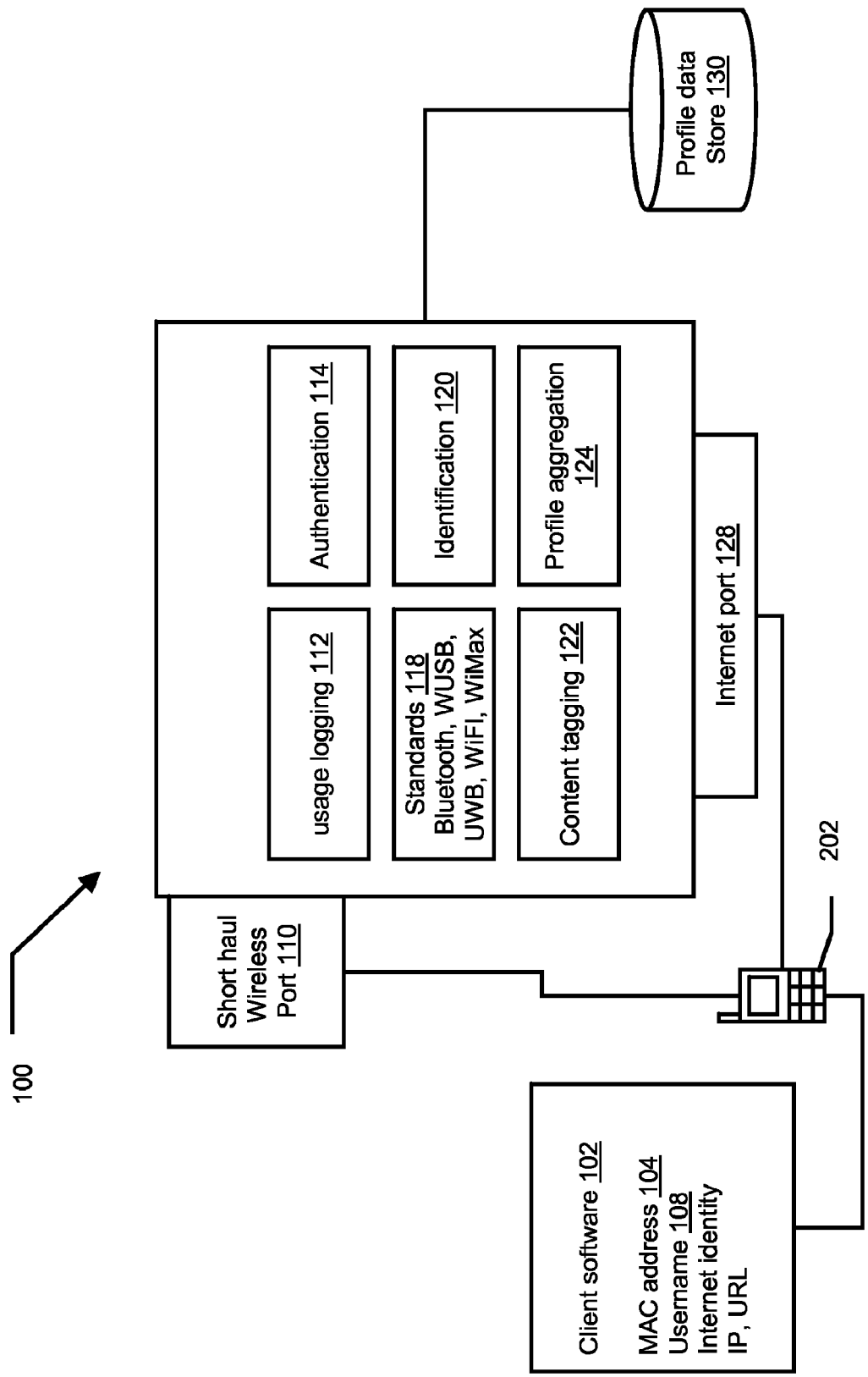
FIG. 1 depicts a DSI-based authentication/identification platform.

Referring to FIG. 1, in certain preferred embodiments of the methods and systems disclosed herein, a DSI-based authentication/identification platform 100 may include profile aggregation 124, content tagging 122, user identification 120, authentication 114, usage logging 112, a standards facility 118, a short haul wireless port 110, a profile database 130, an internet port 128, client software 102, device MAC addresses 104, and a device username 108. A mobile device 202 may include some portions and functionality of the platform 100. The mobile device 202 may also be connected to the platform 100 through the short haul wireless port 110 and/or through the Internet port 128.

Figure 2:
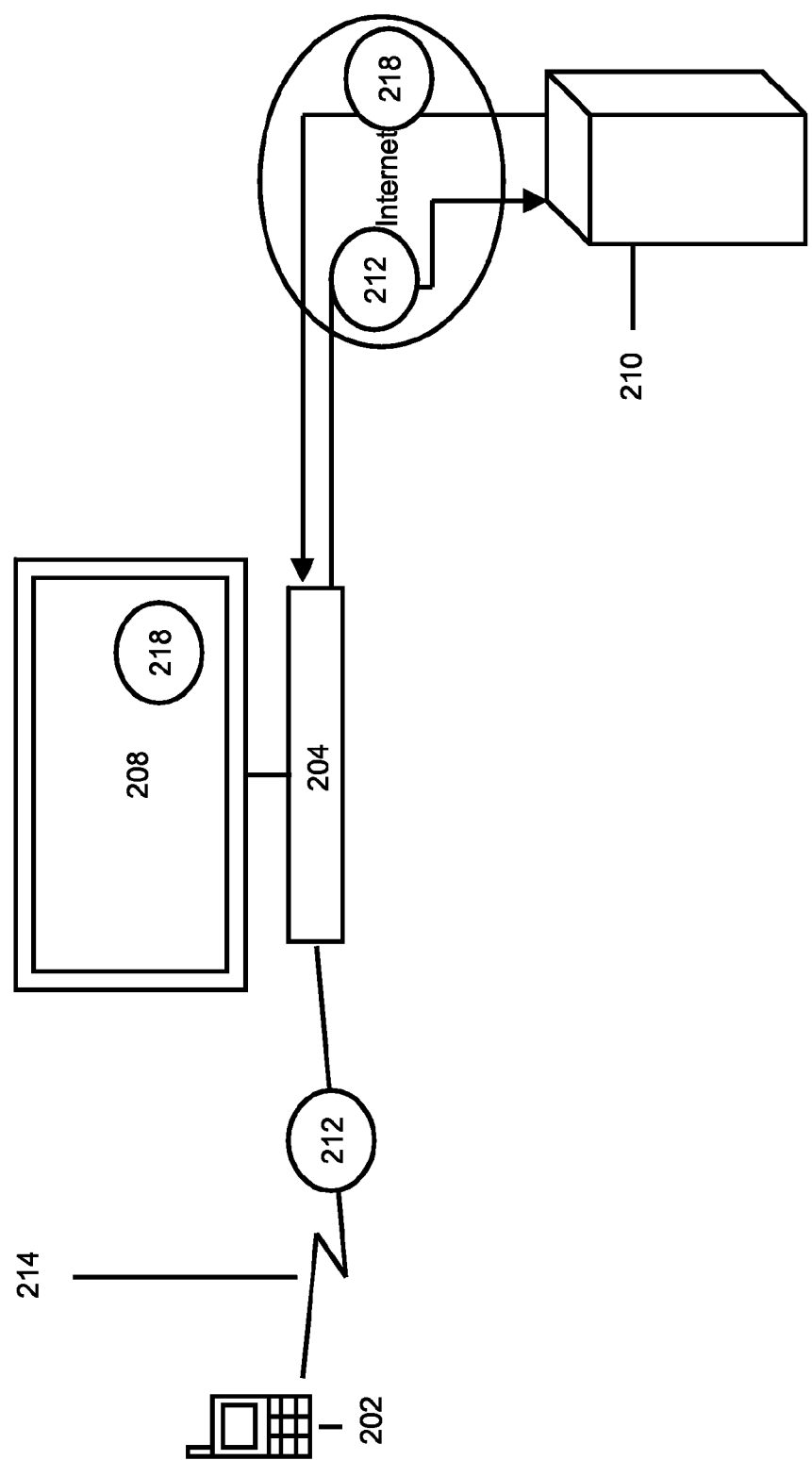
FIG. 2 depicts using a mobile handset DSI to facilitate delivery of targeted television advertising.

FIG. 2 depicts using a mobile handset DSI to facilitate delivery of targeted television advertising 218. A mobile handset 202 may be in communication with a set-top box 204 or other Internet-connected device that is controlling a television 208. The mobile handset 202 may be in communication with the set-top box 204 through a wireless interface 214, such as short distance wireless interfaces including WiFi, Bluetooth, WUSB, UWB and the like. The mobile handset 202 may include location technology such as a GPS receiver/cellular/radio wave triangulation to further assist locating the relative position of the handset user and the television 208. The set-top box 204 may be connected to one or more host servers 210, such as through the internet, to communicate content related to functions of the set-top box 204. The host server 210 may include functionality to support the identification and selection of content, such as advertisements 218, based the mobile handset 202 device-specific identification (DSI).

In the embodiment of FIG. 2, a viewer who may be carrying the mobile handset 202 on his person may sit down in front of a television that is connected to the Internet. The internet connection may be via the set-top box 204, which may be one provided by a cable company, satellite company, internet service provider, etc. The set-top box 204 may also be separate from the ones provided by the providers of television/internet data services (e.g. Microsoft's X-box, AppleTV, and the like). Alternatively the television 208 may provide internet communication.

To deliver targeted advertising 218 to a user of the mobile handset 202 who may be viewing the television 208, the set-top box 204 may extract the mobile handset DSI 212 by employing a short-distance wireless technology (WiFi, Bluetooth, WUSB, UWB, and the like) to locate mobile handsets within viewing proximity of the television 208. The mobile handset DSI 212 (also known as mobile DSI or just DSI) may then be uploaded from the set-top box 204 over the internet to the host 210 for matching to a user-specific authentication/identification profile (a user profile) that corresponds to the uploaded DSI 212. The servers 210 may be servers associated with the DSI platform 100, or may be associated with partners or affiliates of the platform 100. The server 210 may mine data across an uploaded user authentication/identification profile that corresponds to the extracted mobile DSI 212 and use the information for precision advertisement targeting. By using location based technology such as GPS/cellular/radio wave triangulation, a more precise location for the user may be determined so that advertising for a user viewing the television may be presented on the television 208. The location based technology information may be retrieved from the mobile handset 202, such as by querying the mobile handset 202 or the location information may be included in the initial extraction of the DSI 212 by the set-top box 204. The host server(s) 210 may then find the most appropriate advertisement 218 and distribute the advertisement back to the set-top box 204 for display on the television 208. In an example, advertisements 218 may come in the form of dynamic, embedded content advertisements 218. Interactivity during the period of display of the advertisement can be monitored and recorded by the servers 210 for the purposes of adding more data to the corresponding user authentication/identification profile.

Figure 3:
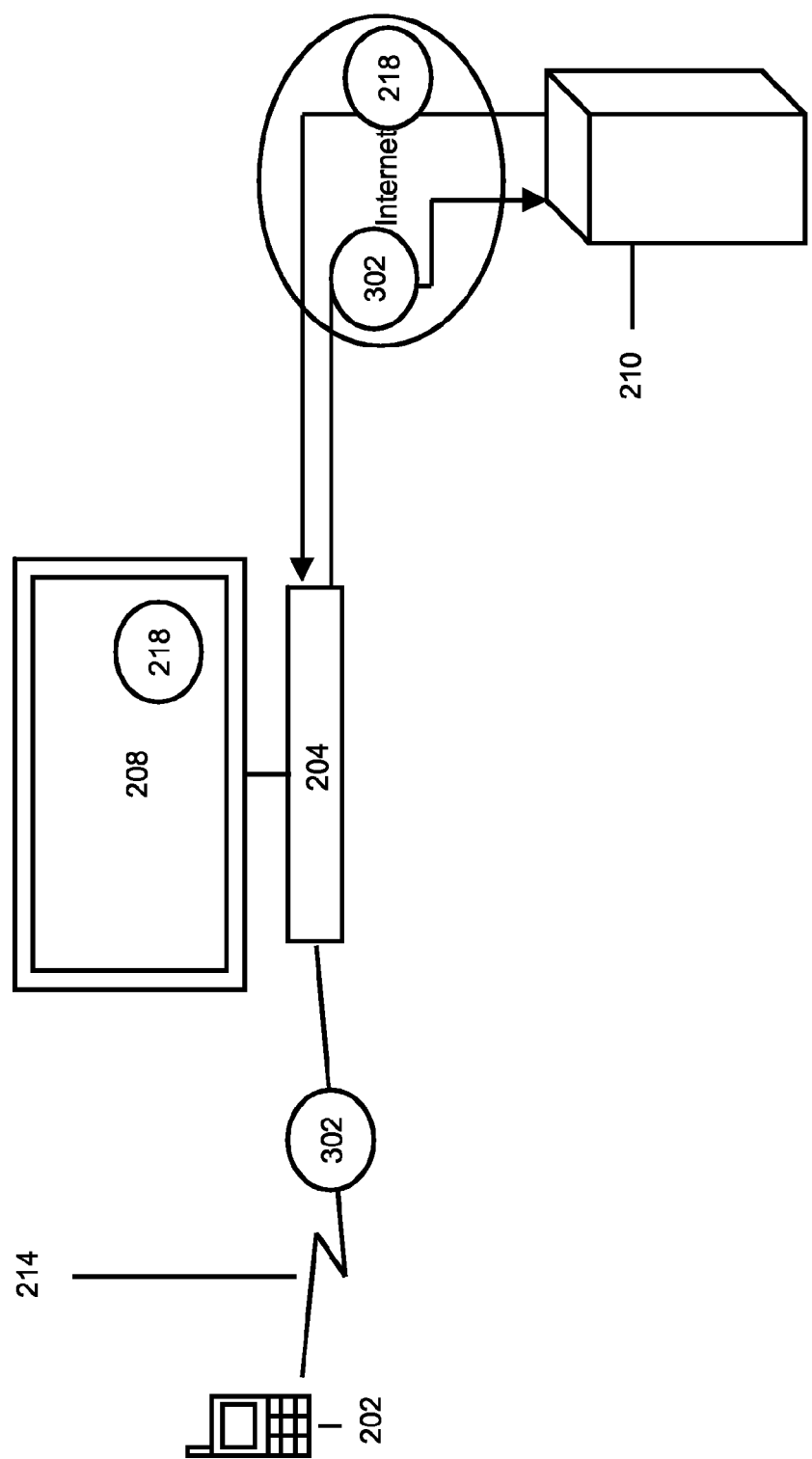
FIG. 3 depicts providing recent historical usage information (internet browser cache data) from a mobile device to a server on the internet.

An alternative embodiment for delivering targeted advertising 218 to a television that may be viewed by a user of a mobile handset is depicted in FIG. 3. In the embodiment of FIG. 3, recent historical information 302 from the mobile handset 202 web browser or other user interface software may be retrieved by the set-top box 204 and forwarded to the servers 210. Alternatively, the servers 210 may prepare a query that is passed to the handset 202 by the set-top box 204 and the recent historical information 302 may be included in a response to the query.

In addition to, or in place of sending the DSI 212 to the server 210, the set-top box 204 may extract information, in its entirety or derived from the mobile handset's Internet browser cache and forward it to the servers 210. The extracted internet recent historical information 302, such as represented by a internet browser cache, may be combined with a user profile or usage profile corresponding to the DSI 212 to determine relevant analysis about the historical information 302. Alternatively, the recent historical information 302 may be analyzed alone. The information may be analyzed for demographic, interests, trends, and the like that may facilitate the servers 210 determining an appropriate offer or advertisement 218 to present on the television 208 that the user of the mobile handset 202 may be viewing.

In an embodiment, presence of a mobile phone may be used to identify the users who are present/within viewable proximity in front of a television or other electronic display by virtue of the distance of their mobile handsets from the television or other electronic display. Communication with a mobile phone or mobile handset 202 may include using short-distance wireless technologies, such as WiFi, Bluetooth, WUSB, and UWB to identify nearby mobile handsets 202. Precise user location may further be determined via device-specific GPS/cellular/radio wave triangulation alignment. Such detection may be used to derive real-time and accurate content audience ratings.

Figure 4:
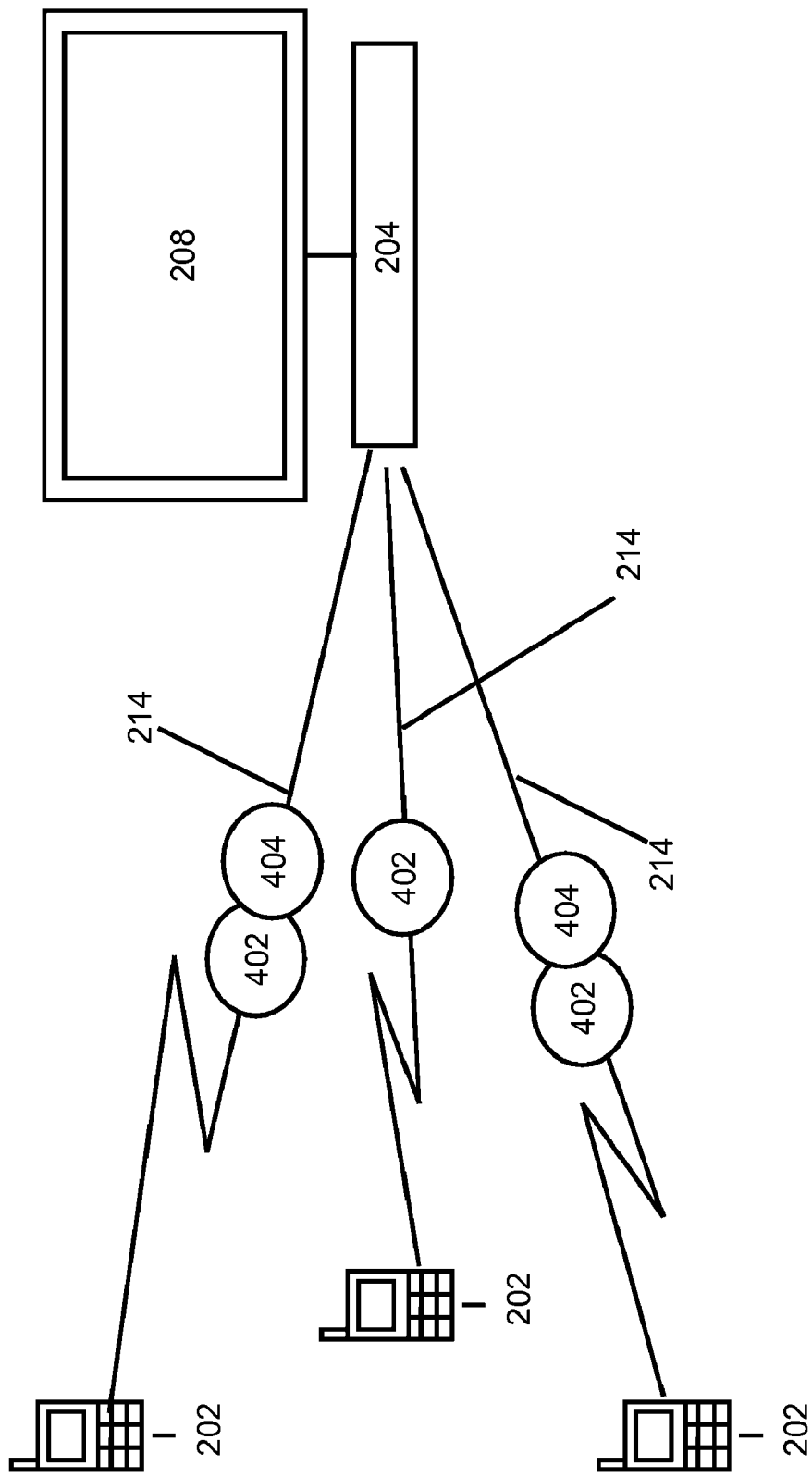
FIG. 4 depicts determining a presence and a location of mobile handsets in proximity to a set-top box.
Figure 5:
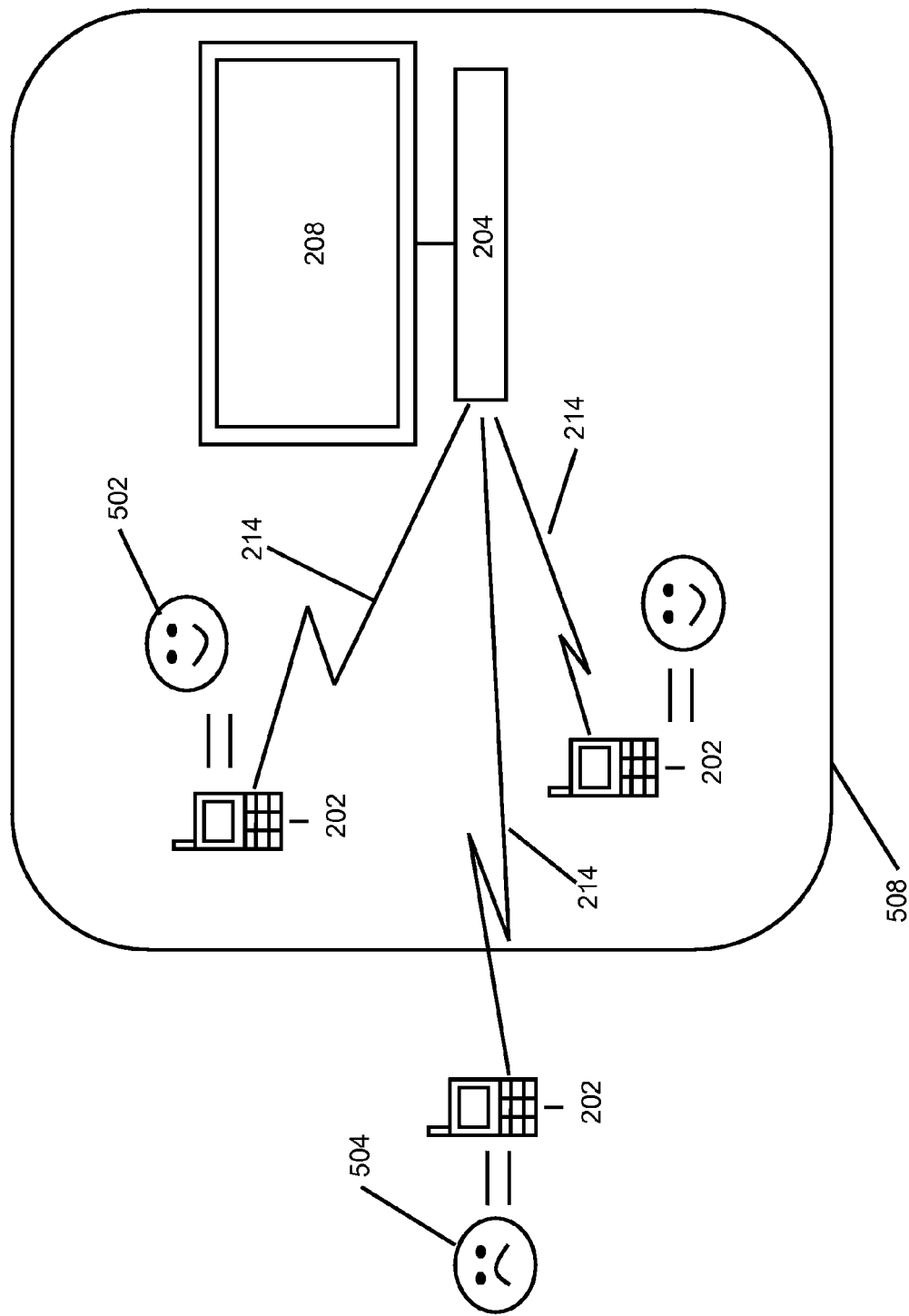
FIG. 5 depicts determining a presence and a location of mobile handsets in proximity to a set-top box in order to determine a presence of viewers by virtue of the presence of their mobile handsets.

FIGS. 4 and 5 each depict determining a presence and a location of mobile handsets in proximity to a set-top box. Using radio wave distance-mapping methods, the set-top box may determine a distance and a direction of mobile handset 202. The set-top box 204 and/or internet television 208 may determine if the presence and distance of detected mobile handsets 202 can support an assumption that the detected mobile handsets 202 represent individuals 502 within viewing proximity 508 of the television, or viewers 504 outside a viewing proximity 508 of the television 208. This will allow the set-top or the television to determine individuals within viewing proximity of the television by virtue of the presence of their mobile handsets. Individual handsets 202 may be detected uniquely by retrieving the handset DSI 402 and, when available, a GPS/cellular/radio wave triangulation coordinate 404 for the handset. By associating the DSI 402 with a user identification as described in reference to FIG. 2, an identity of the viewers or listeners in detectable proximity to the television 208 may be determined.

The methods and systems herein may facilitate real-time television or other electronic display audience rating/headcount via use of mobile DSI and/or mobile handset internet browser cache. Once it has been established that individuals, by virtue of the presence of their mobile handsets, are viewers in front of a given television or other electronic display, the methods and systems herein may include using the mobile DSIs of the given mobile handsets (and profiles of usage associated therewith, including usage of non-mobile devices) for the purposes of retrieving a real-time, audience ratings/headcount, which pertains to various demographic categories/metrics. This may involve the use of Internet usage profiles associated with the mobile DSI but also may take into consideration usage activity from non-mobile devices. Usage profiles provide a way of tracking of Internet activity which can result in strong assumptions of real-time, viewer-specific demographic data.

Alternatively real-time viewer attendance may be determined through the extraction of each proximate mobile handset's Internet browser cache, in place of extraction of the mobile DSI, which can also effectively report real-time viewer demographical data as determined by the Internet usage patterns which can be recognized by analyzing the mobile handset's Internet browser cache contents.

Figure 6:
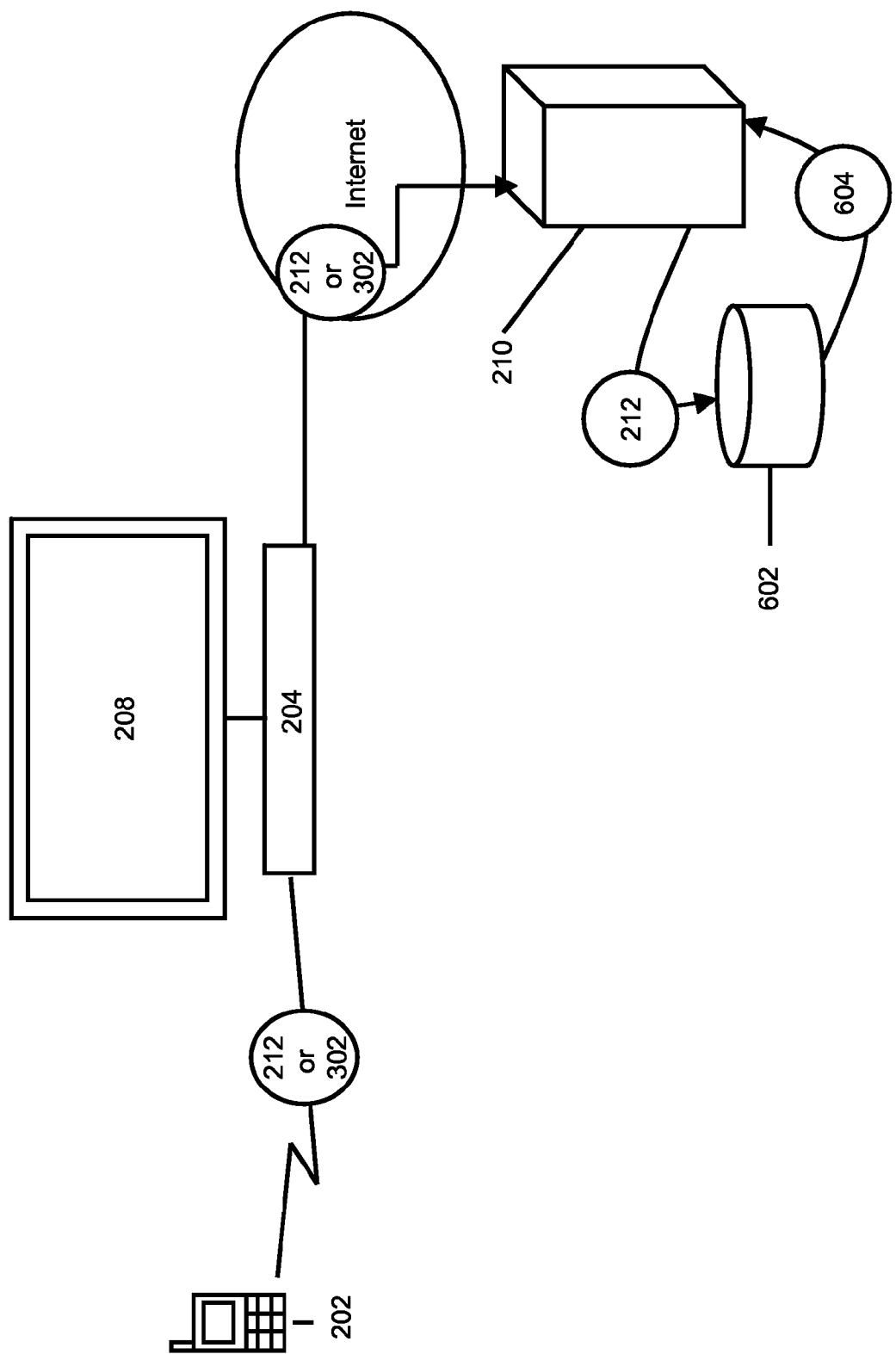
FIG. 6 depicts uploading DSI or browser cache data over the internet to a host and the processing there.

Referring to FIG. 6, after establishing unique mobile handsets or personal devices as determined by the presence and distance of their mobile handsets from a nearby a television or other electronic display as described in reference to FIGS. 4 and 5, the set-top box 204 or the television 208 uploads the detected mobile device DSIs to host servers 210. The servers 210 compare the extracted Mobile DSI 212 across a database of user-specific authentication/identification profiles 602 to find the profiles which correspond to the extracted mobile DSIs (resulting in a corresponding profile 604). Using information from the corresponding user-specific authentication/identification profiles 604, servers 210 may make demographic assumptions.

Alternative to using the mobile device DSI and cross referencing it to a database of user identities, demographics and audience classification may be determined by analyzing an internet browser cache 302 associated with the proximate mobile handsets. Information such as historical browsing data, queries, locations, communication such as texting, email, and the like may be analyzed by the servers 210 to determine real-time viewing audience aspects.

Through this method, a mobile handset may effectively allow for the creation of real-time audience ratings which include various demographics determined by identifying the participants in a viewing audience as well as relative Internet usage metrics. The derived or measured real-time viewing information may be provided in a report to broadcasters, advertisers, and the like to become part of a broadcast or programming business process.

User-specific authentication/identification profiles may be based on mobile device or personal device device-specific identifications (DSIs), such as for the purposes of user-specific multi-device internet usage tracking and profiling. User-specific authentication/identification profiles may include a user identity, usage tracking, and the like. Establishing user-specific profiles may involve tracking of activities associated with user names that are linked or tied to the mobile DSI; and linking those usernames to other (non-mobile) DSIs to aggregate user-specific activities regardless of which device(s) the activities take place. One useful purpose for this aggregation of mobile and non-mobile activity tracking is targeted advertising.

Defining, extracting, and using mobile device specific identifiers (DSIs) may make use of server-side and/or client-side software. Server-side software may reside on the servers 210 or may reside elsewhere and be executed on the servers 210. Client-side software may be downloaded onto or otherwise configured into mobile and/or stationary devices used by end users. The client-side and server-side software may be used when a mobile device user visits a website in order to gain access to content residing on servers that require authentication and/or user identification. One or more of the client-side and the server-side software may include creating and updating logs associated with a mobile device DSI once a known visitor has gained access to servers providing access to the requested authentication protected content. DSI based logs may differ from cookies or other Internet usage logging technologies in that DSI logs may have the ability to completely mask the real world identities of users as their user-specific authentication/identification profiles can be created with a process that results in the complete morphing or excluding of anything that renders the user identifiable in the real world. Additionally, the DSI specific logs are initiated, conducted, and managed on the server side rather than on the device as is common for cookies. Also, client-side software may provide capabilities that pertain to uploading device-specific information and existing information already contained in the mobile device prior to engagement with the server 210 or with the website a given user is attempting to access. This results in an important difference from information/behavioral software existing today such as cookies that log behavioral activity on the client device.

Figure 7:
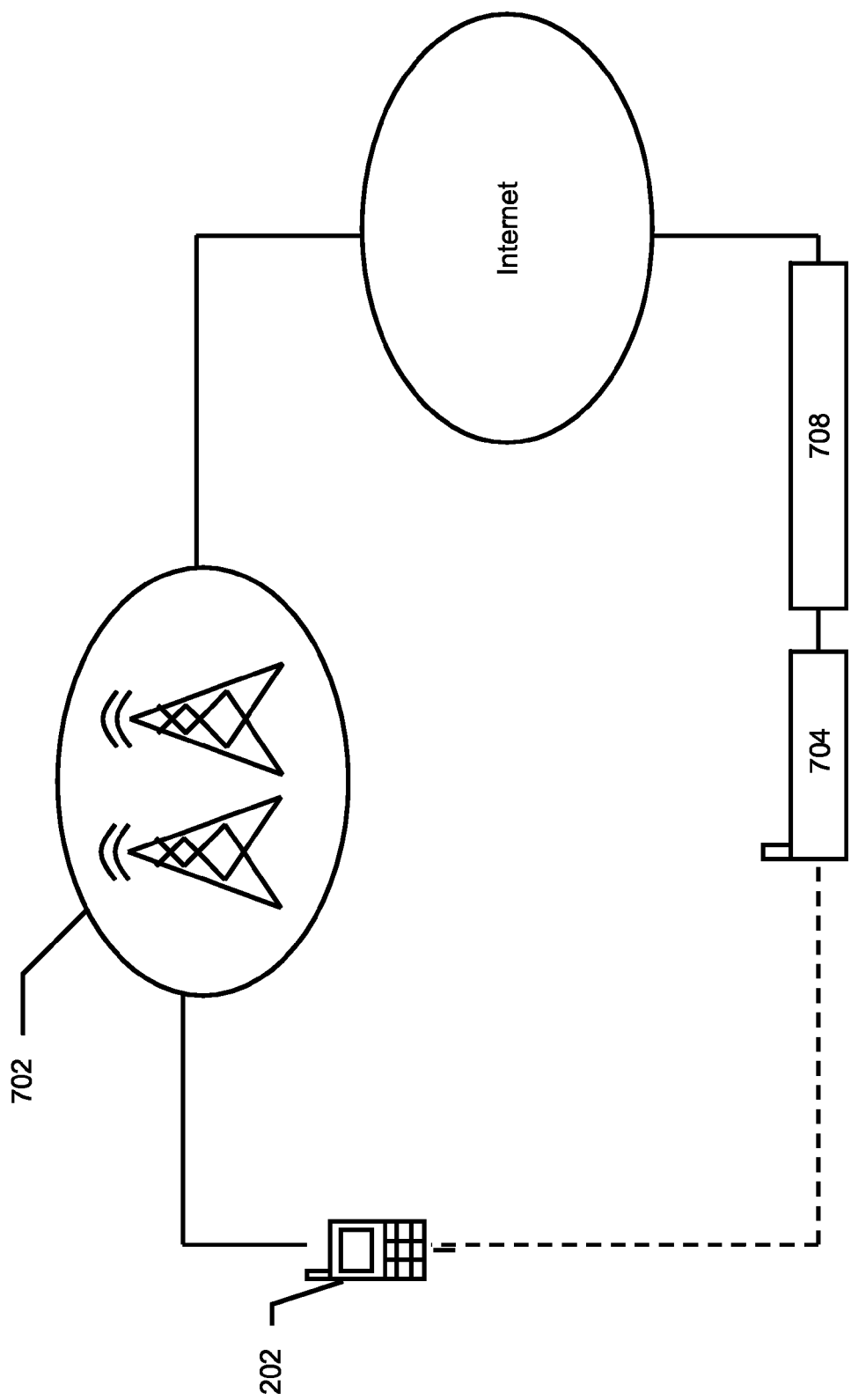
FIG. 7 depicts a typical wireless network device gaining access to internet resources.

FIG. 7 depicts a typical wireless network device gaining access to internet resources. Mobile handheld device 202 communicates through a wireless provider's network that may comprise cellular phone towers 702 for cellular connections such as CDMA, GSM, or IP-based WiMax connections. The wireless provider's network may include an access point to the internet through which a mobile handset 202 may send and receive information over the internet. The same mobile device 202 may also communicate through a wireless IP-based interface, such as WiMax, or WiFi, and other wireless protocols such as Bluetooth, WUSB, or UWB and the like 704. The WiFi router 704 may interface to the internet through a WiFi Back-Haul 708 such as through T3, Cable, DSL, or any other broadband connection. This exemplary network connection scheme may provide an access path from the mobile handset 202 to the internet and servers such as a host server 210 herein described.

Figure 8:
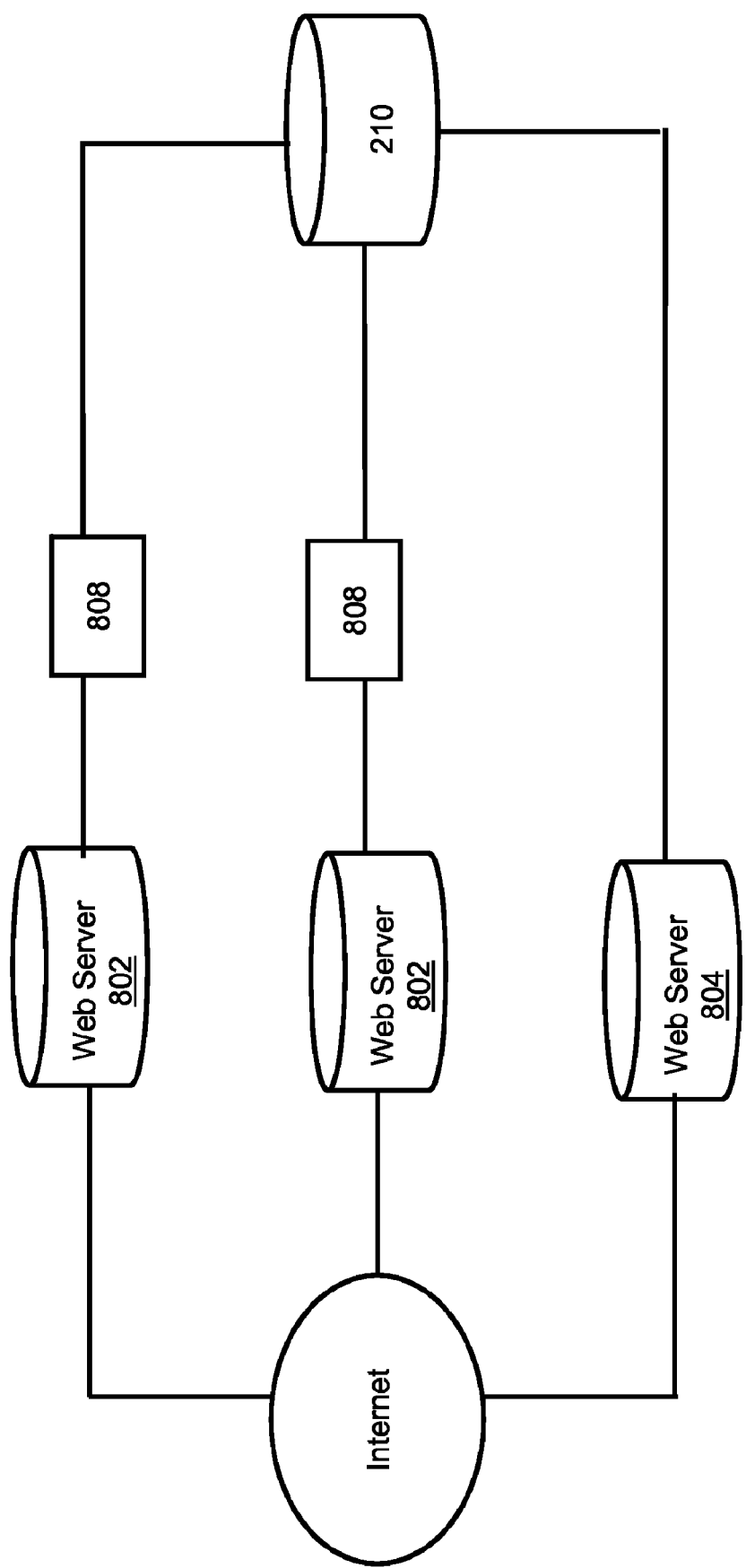
FIG. 8 depicts a very simplified embodiment of the internet with a plurality of web sites and servers.

For pedagogical purposes, FIG. 8 depicts a very simplified embodiment of the internet with a plurality of web sites and servers, wherein some web sites require authentication and/or identification, and other web sites may often provide a fulfilling web experience without the collection of usernames/passwords normally associated with authentication. Web sites represented by web servers 802 and 804 may, based on a need for user authentication/identification operate server-side software 808 associated with the systems and methods herein described. In FIG. 8, it is assumed that web servers 802 execute the herein described server-side software 808, and web servers 804 do not. Generally, although variations may occur, websites 802 may require a username/password to be input by visitors for a more personalized experience (e.g. social networks, email, and the like).

Figure 9:
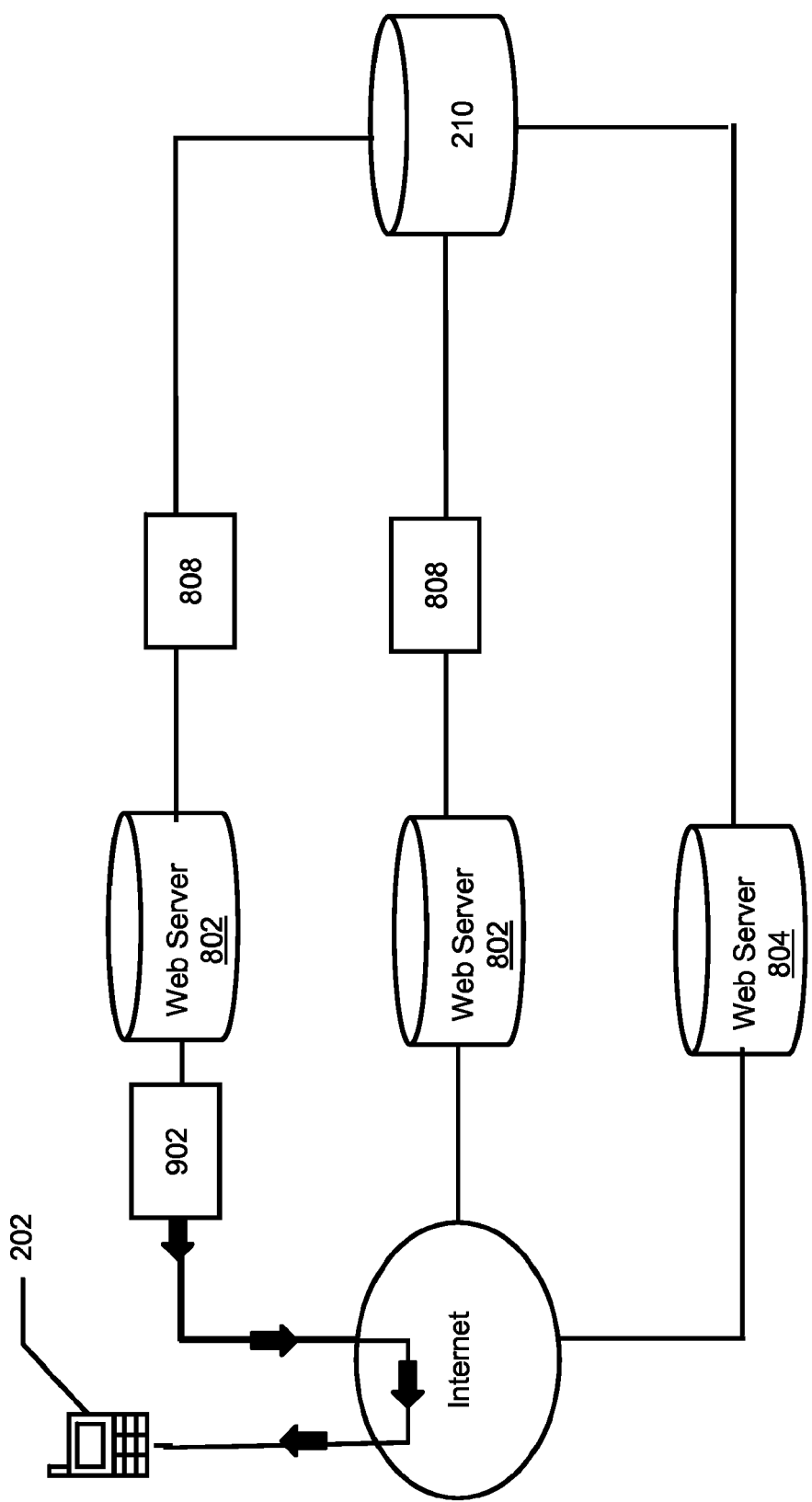
FIG. 9 depicts the delivery of client side software by a web server to a mobile handset.

FIG. 9 depicts when a mobile handset 202 identifies itself to a web server 802, such as through the network described in any of FIGS. 1 through 7 and server-side software 808 executing on the server may run a check on the mobile device 202 to see if it has the most current client-side software 902. If the mobile device does not have the most current client-side software 902, the user may be asked to download it to gain access to content on the authenticated website. Downloading of the client-side software 902 onto the mobile handset 202 may be facilitated by the server-side software 808 residing on a website's servers. Alternatively, the latest client-side software 902 maybe automatically downloaded to a device 202 that has identified itself to the server 802.

Figure 10:
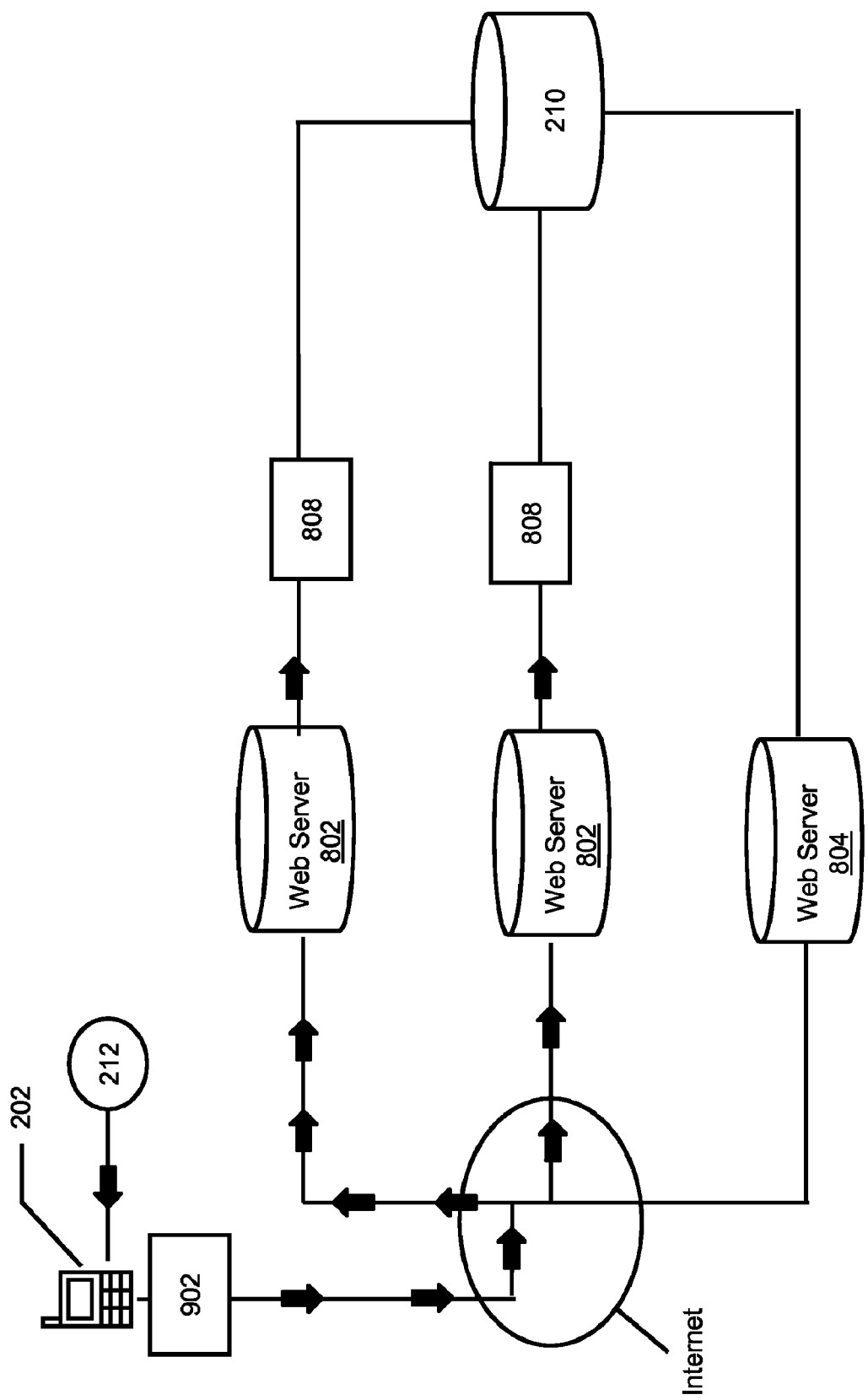
FIG. 10 depicts client side software communicating the device identifier or device-specific identification (DSI) over the internet.

Referring to FIG. 10, upon completion of download and installation, client-side software 902 may begin executing on the mobile device 202. The client-side software 902 may be responsible or collecting relevant and necessary information from and about the mobile device, such as a MAC address, username, password, browser cache settings, and the like to provide a DSI 212. The client-side software 902 may deliver the DSI 212 to a web site/internet server contemporaneously with a first access to the web site/internet server 802. A web site server 802 that is executing the server-side software 808 may collect the DSI 212 during authentication, or if authentication is not required, the server 802 may also collect the DSI 212. Information stored on the mobile device 202, such as a browser cache, may be transmitted to the server 802 to update information related to the device DSI 212. It is important to note that unlike cookies, the client-side software 902 will not monitor the device related activities of the user, rather just identify of the device (mobile or non-mobile) that is currently connected to the server 802 along with existing properties of that device is recorded. Although past behavior may be included in the information uploaded to the server 802, such as data derived from an Internet browser cache on the device, logging of the activities once the device has been connected to a given website server 802 will be done by the server-side software 808, not the client side software 902.

Figure 11:
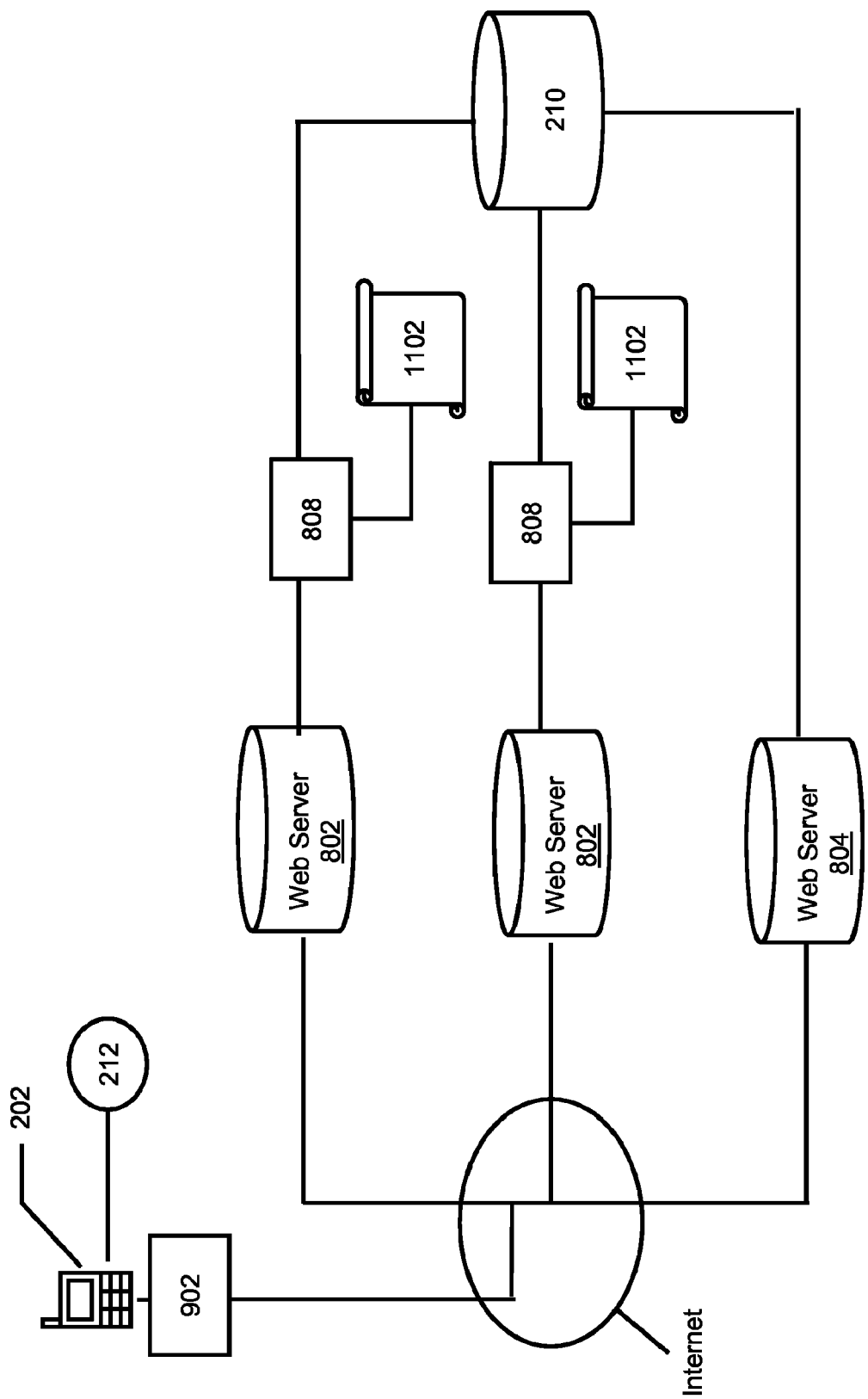
FIG. 11 depicts the creation of DSI-specific logs being facilitated by a web server's server-side software once it has obtained a mobile handset's DSI.
Figure 12:
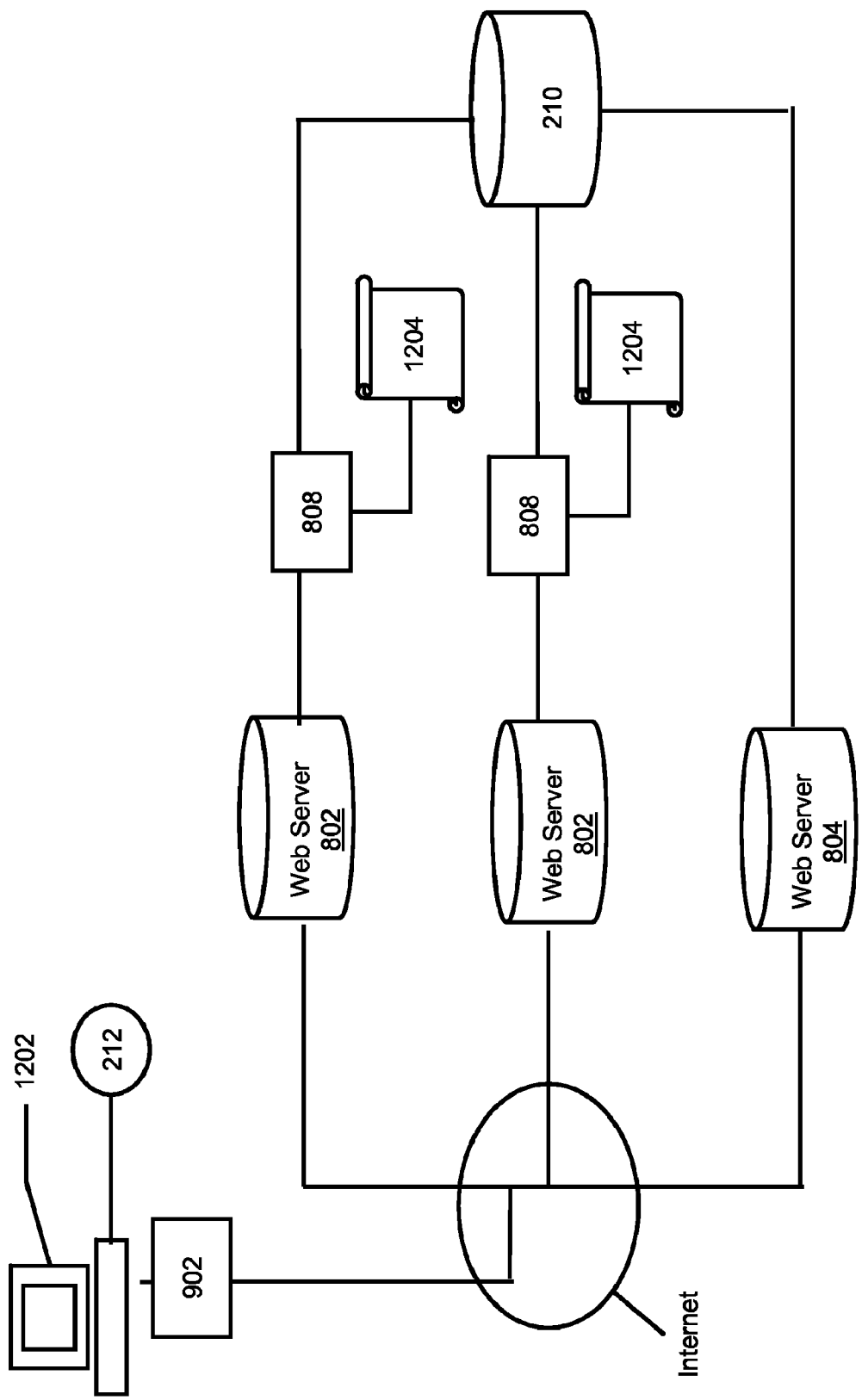
FIG. 12 depicts a device other than a mobile device providing a DSI for the creation of DSI-specific logs facilitated by a web server's server-side software once it has obtained a mobile handset's DSI.

Referring to FIGS. 11 and 12, upon receipt of a DSI 212, a server 802 executing server-side software 808 may begin tracking usage of the website supported by the server 802 in a DSI specific log 1102. FIG. 11 depicts a configuration with a mobile device 202 providing the DSI 212; whereas FIG. 12 depicts a device other than a mobile handset providing a DSI 1202, such as a PC, providing the DSI 212. Information collected from the mobile device 202 or the non-mobile handset device 1202 may include the device identifier (e.g. the MAC address), username, password, GPS/cellular/radio wave triangulation data, browser cache data, and the like. The information collected may be stored in association with the mobile device DSI log 1102 as shown in FIG. 11 or with the non-mobile handset device DSI log 1204 as shown in FIG. 12.

Figure 13:
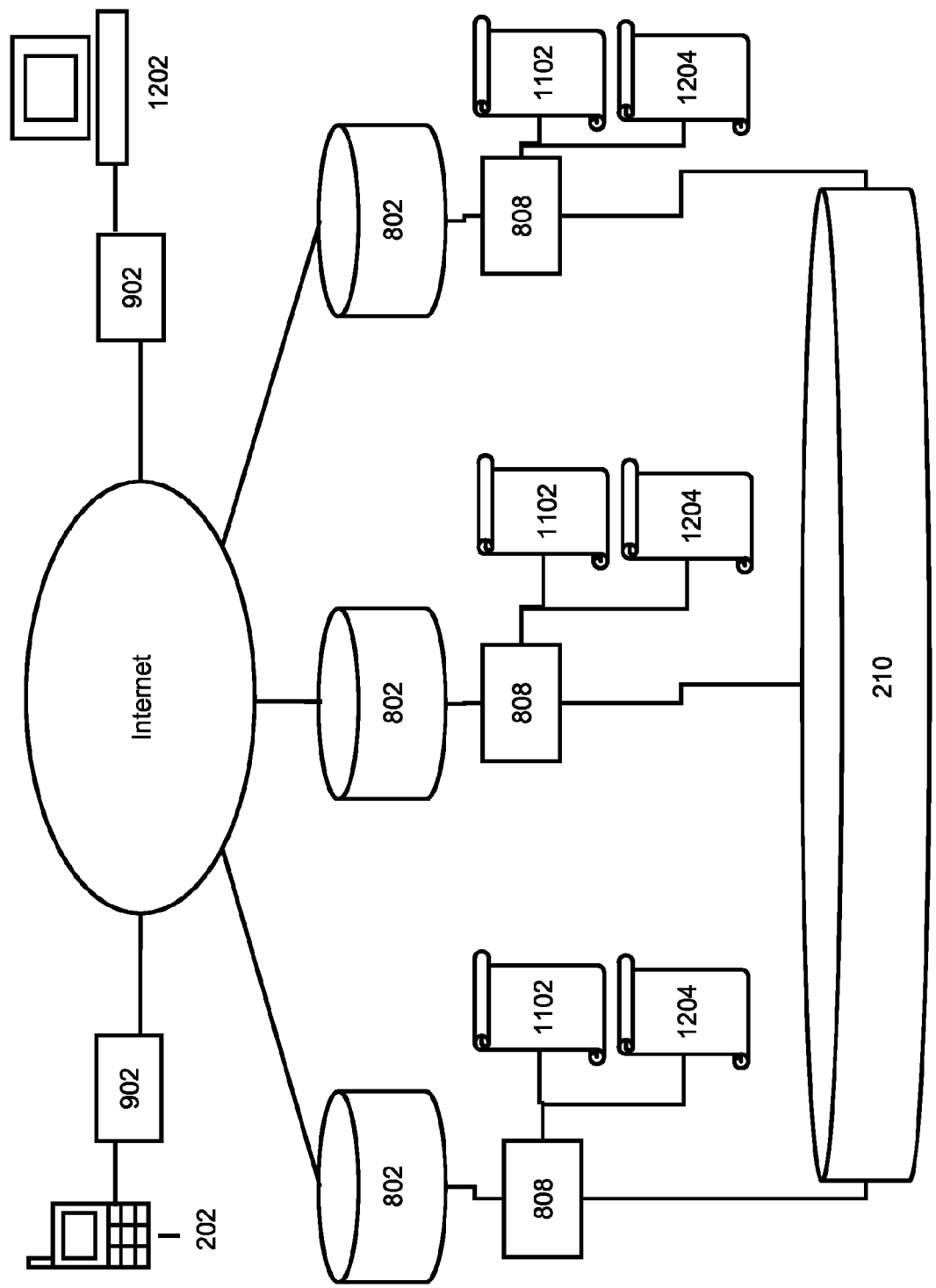
FIG. 13 depicts a plurality of devices, submitting their respective DSIs to servers, for the production of DSI-specific usage logs.

FIG. 13 depicts a configuration wherein at least two devices and a plurality of servers are embodying the methods and systems herein described. The embodiment of FIG. 13 includes a mobile device 212, a device that is not a mobile handset may be a wired PC, a laptop with WiFi, or any other Internet-enabled device that is not a mobile handset. 1202, a plurality of servers 802 executing server-side software 808 and recording a usage log (1102, 1204) for each device (202, 1202).

Figure 14:
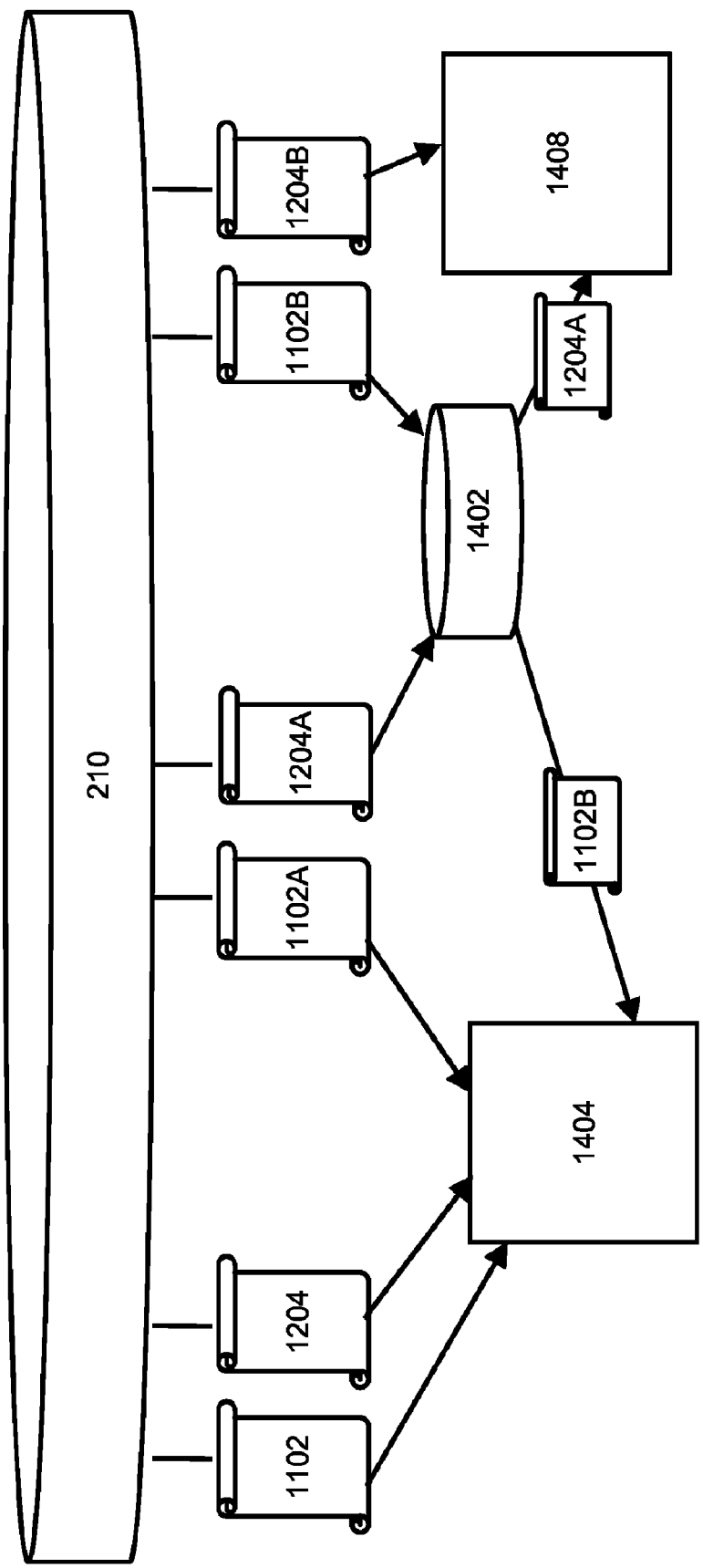
FIG. 14 depicts formation of user-specific authentication/identification profiles as a result of DSI and username aggregation and compilation of usage logs associated therewith

Referring to FIG. 14, the DSI information and the usage logs may be forwarded onto a host server 210 for the purposes of analyzing and relating the various information to provide usage or user profiles. FIG. 14 depicts a host server 210 accessing the information collected from the mobile or non-mobile handset and the corresponding usage logs to determine associations between them. In particular the host server 210 may determine that two different DSIs and corresponding usage logs may be associated with a single user or a single entity, such as a business. By collecting a DSI and recording a usage log for each connection of a DSI enabled device to a server 802 executing server-side software 808, a host server 210 may associate a username that may have been provided by a user of a DSI enabled device to access authentication protected internet content with the same or related DSIs collected by other servers 802 and reported to the host server 210. In the embodiment of FIG. 14, three usage logs from three different servers are analyzed to associate a username to a DSI and its corresponding usage data. The host server 210 may also search through a database of existing DSIs, usage logs, and usernames to determine such an association. The database of existing DSIs and usernames may be derived from data provided by web servers 802 connected to the internet and is not restricted to the three web server log configuration depicted in FIG. 14. By identifying associations between the usage logs provided to the host server 210, the host server 210 may create user profiles, such as user authentication/identification profiles that may be useful for purposes such as targeted advertising, while enabling the protection of the privacy of the individual associated with the user profile through morphing the identifying information so that third parties, such as advertisers, cannot determine the user's identity. The host server 210 may also provide privacy protection by requiring the advertisers to target advertisements to users through the host server 210. Alternatively, the user authentication/identification profile, or data derived from it, may be provided to third parties, such as advertisers or web sites so that one or more devices identified by DSIs associated with the user profile may be targeted to receive advertising. By morphing data from the DSI logs that are created and kept on a web server, and sending the morphed data to the host server, the host server may anonymously create user-specific profiles across various devices. In this way, even the host server does not have the information necessary to find the real world identity of the user associated with the user profile.

Referring further to FIG. 14, host server 210 accesses usage logs from at least three servers. Usage logs that directly contain common user names are aggregated into a user authentication profile 1404. In this embodiment, usage logs 1102, 1204 and 1102A can be identified by the host server 210 as having common usernames. Usage log 1204A does not have a username that matches those aggregated into profile 1404 so it is compared to a data store 1402 of usernames and associated DSIs that includes historical data as well as usage data being provided by other web servers to the host server 210. Usage log 1204B is associated with user profile 1408, while usage log 1102B is compared to the data store 1402. The lookup of the usernames and/or DSIs from usage logs 1102B and 1204A through data store 1402 results in usage log 1102B being aggregated with user profile 1404 and usage log 1204A being aggregated with user profile 1408.

In addition to checking usernames in usage logs against other usage logs, DSIs in usage logs may also be checked in a similar way. A usage log that contains a DSI but does not contain a username may be aggregated with a user profile by associating the DSI in the usage log with the information in the data store 1402 to determine an appropriate user profile for aggregating the usage log data.

Even when there is no direct correlation among usernames and DSIs, such as when a DSI does not have any username associated with it, a user profile may be created for the DSI so that all usage associated with that DSI may be aggregated under the DSI specific user profile. In this way, user authentication/identification profiles may be established and used even without a username or other personal identifying information associated with the profile.

Because users often perform a variety of activities during an on-line session or connection, time analysis of logs may facilitate determining user names for DSI log entries for which a user name is not required by the server generating the DSI log. If activity associated with a DSI is logged by a website that requires a username login, and another site that doesn't require a username logs activity from the same DSI at nearly the same time, such as shortly before or after the website requiring login, it can be determined that for those particular sessions of activity, the visitor is likely to be the same.

When a plurality usage profiles with different DSIs and without usernames, are collected by the host server 210, the host server may analyze the usage related data to determine associations that may allow the formation of a user profile associated with the different DSIs.

Figure 15:
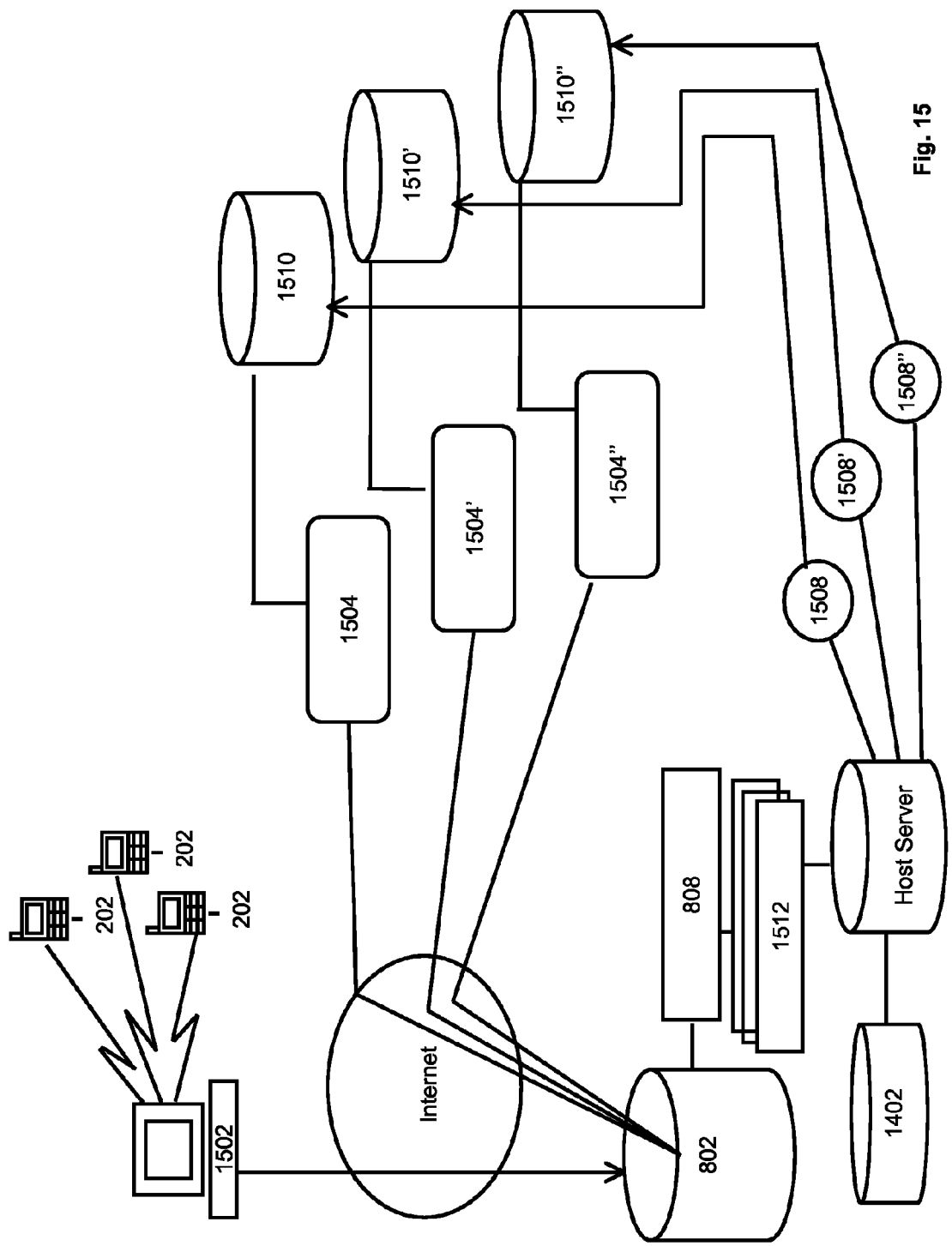
FIG. 15 depicts real-time audience tracking of embedded web objects that may be a distribution method for super distributed content in association with DSI-based audience tracking.

FIG. 15 is a depiction of the methods and systems herein applied to embedded web objects for real-time audience tracking of super distributed content. Software residing on website servers which allows embedded objects (e.g. widgets, flash objects, videos, music, and the like) may be adapted to extract the DSI of a device on which the website is being executed and the DSIs of surrounding mobile devices. This information may be sent to the embedded object's point of origination, the visited website's own point of origination, and/or one or more host servers 210. This will aid in the process of attaining real-time audience ratings for music, video, and other interactive objects that are embedded across several websites (often known as super-distribution). This method of audience gauging makes irrelevant which website the embedded object was accessed from or through what device it was accessed with because the viewer information can be collected without having to rely on a specific website. Additionally, using the methods and systems herein described, it is possible for embedded content, regardless of which website it is hosted on, to have audience ratings that do not rely upon statistics generated for or by the website on which the embedded content is hosted. Instead, the audience ratings may be obtained from user-specific authentication/identification profiles.

In FIG. 15, a plurality of users of mobile devices 202 may be in close proximity to a viewing or listening device 1502 (such as a screen, computer, radio, and the like) on which a website with embedded objects 1504 is being presented. The DSI of the device 1502 and all proximate mobile devices 202 may be collected and delivered to a web server 802 providing the web site content and the embedded objects 1504. The web server 802 may collect DSI usage logs 1512 and forward the collected DSIs and usage logs 1512 to the host server 210 through the server-side software 808. The host server may package the collected usage data and relate it to each embedded object 1504, perhaps along with demographic information of all collected DSIs (as may be determined from the user profiles corresponding to the collected DSIs by accessing the user profile data store 1402) to provide audience ratings 1508 for the embedded objects 1504. The determined audience ratings 1508 may also be sent to the embedded objects' 1504 originating web server 1510 for correlation and further audience analysis.

The methods and systems may enable ensuring privacy of select user-specific profile/profile activity data via server-to-server data morphing and data exclusion. The methods and systems herein may include the ability to morph or exclude specific parts of the user-specific authentication/identification profile or specific activity associated with a given profile for the purpose of making certain the real world identity associated with the given user-specific identification profile remains private. The result is a highly individualized profiling system that successfully leaves private, the real world identity of those being profiled.

By supporting real world identification to provide digital rights management for authentication protected content and then using morphed information related to the usage by the DSI accessing the protected content, such as for targeted advertising, both the protected individual and the public advertiser may benefit without creating a conflict between the private user and the targeted advertising provider.

Figure 16:
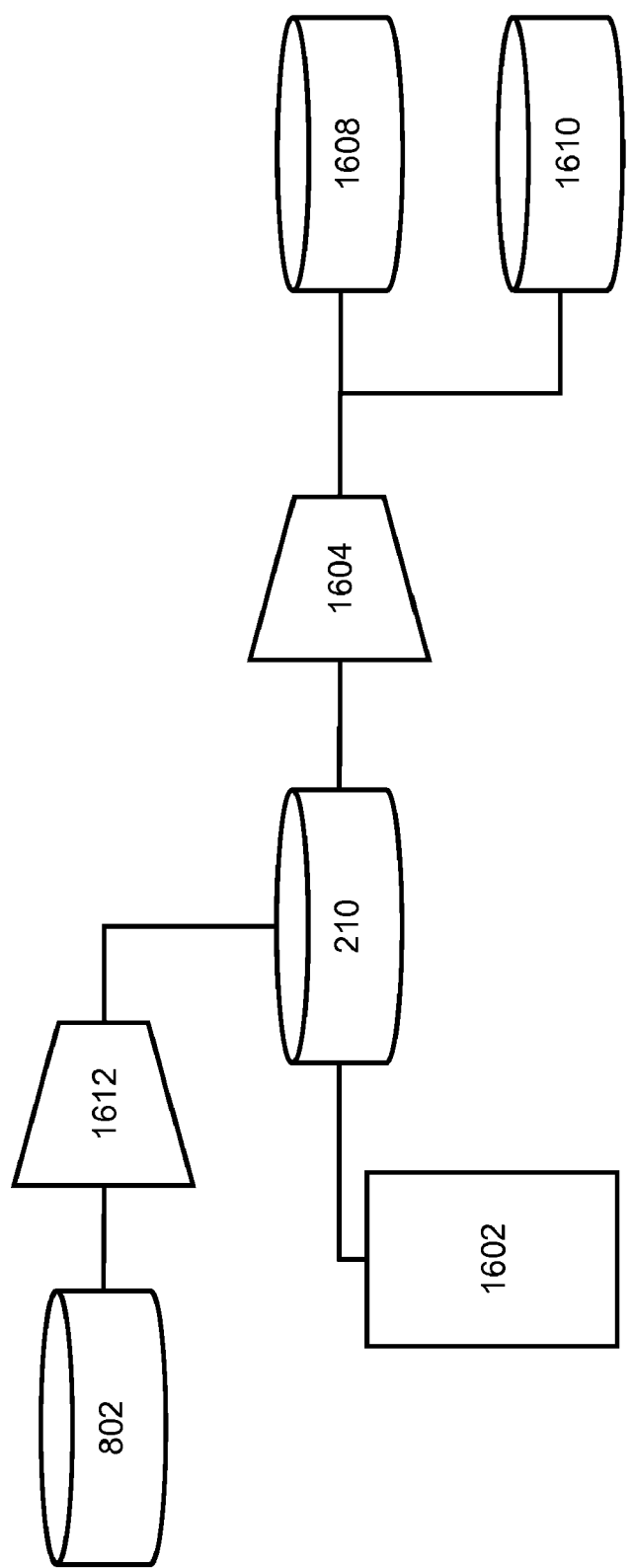
FIG. 16 depicts filtering user information as DSI-based logs and usage data is passed to servers on the internet.

Referring to FIG. 16, when a host server 210 passes information from a user-specific authentication/identification profile 1602, select information, as determined by the purpose of the data exchange, (targeted advertising or content digital rights management, etc) such as name, address, credit card information, etc can be filtered out by a filtering module 1604 that, for example, finds common patterns in computer code. In an example, data fields containing variations of the form "Name" (indicating the next field of user-inputted information to be user's real world name), or Credit Card, and the like can be searched via pre-designed algorithms so such information does NOT pass coherently from the host server 210 to another server, such as a third party advertiser 1608 or service provider 1610. Alternatively, a web server 802 may pass DSI based usage logs through a privacy filter 1612 (that may be embodied as a portion of server-side software 808) to ensure information deemed private or protection-worthy by the web server 802, or as specified as such by the user is not delivered to the host server 210. Filtering techniques may be applied throughout the transfer of DSI based information before and after the formation of a user profile.

Using short-distance wireless communication to pass a mobile device-specific identification, such as a DSI, to another nearby device, such as another mobile device or an internet connected device, may allow the mobile device-specific identification to be used to secure content that is presented (e.g. displayed, stored, played, and the like) on the other device. Examples wherein the mobile DSI may be used to secure content presented on another device include authentication for digital rights management and content sharing. An example of content sharing may include playing music, movies, shows, and the like authenticated by a mobile device DSI, such as a mobile phone, while the phone is in proximity to the sharing device—but only while the phone is in proximity. When the phone is no longer in proximity, the content sharing device may be denied access to present the authenticated content. Digital rights/authentication could be associated with the authentication/identification profile corresponding to the mobile phone DSI. This authentication/identification profile may also be used for targeted advertising. However digital rights management data that is transferred to third parties may include an interface that is more transparent of the specific individual, such as by keeping other data (e.g. surfing habits) out of view or filtered from the third party.

In an embodiment of the digital rights authentication process herein described, content authentication may include tagging a representation of the authenticated mobile DSI onto the protected content/service prior to distributing the protected content/service to a device which is providing the sharing or presentation capability. In this way, client-side software associated with the sharing or presenting device may ensure that the authenticated DSI mobile device remains in proximity to the sharing device. When such proximity is no longer detected, the tagged content may be invalidated, deleted, or otherwise blocked from access by the sharing/presenting device.

Figure 17:
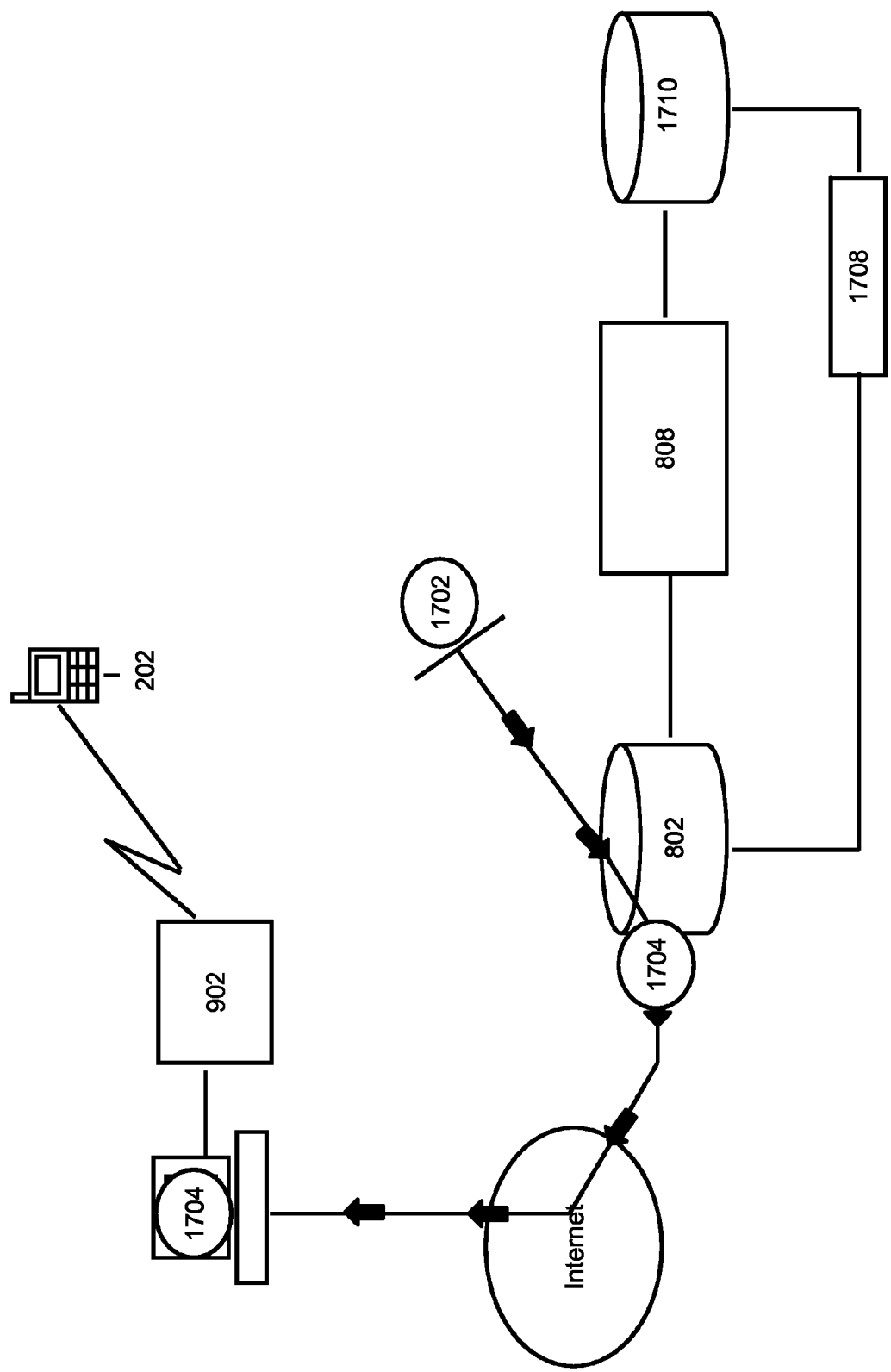
FIG. 17 depicts delivering authentication protected content in a DSI-enabled digital rights management/content authentication system.

In reference to FIG. 17, authentication protected streamed data 1702 such as text, data tables, embedded pictures, music, video and the like, can be tagged with the mobile DSI of the mobile handset 202, providing a DSI authentication tagged content 1704, so that only the authorized user, as determined by the mobile handset 202 that matches the mobile DSI stamped onto the content during stream or download, will be able to access the tagged content 1704. Tagging the protected content 1702 may prevent other users on wireless networks, or in the vicinity, from maliciously or accidentally intercepting the data in coherent form as it will be tagged with the authorized user's mobile DSI. Such tagging may render the content invalid for correct playback unless the authenticated user mobile device DSI is detected within proximity. Alternatively, the tagged content may be incoherent to any device other than the device containing the authenticated DSI. Tagging may be performed by the web server 802 by communicating with an authentication entity 1710, such as through the server-side software 808. The authentication entity 1710 may provide an authentication DSI 1708 that may be converted into a tag and combined with the protected content 1702 to provide tagged protected content 1704.

In embodiments, once on the mobile handset, protected content may be streamed to another device via short distance wireless communication (e.g., WiFi, Bluetooth, WUSB, or UWB) during which time playback software on the receiving device may temporarily play content as it is transmitted from the mobile handset to the receiving device. The receiving device may then, such as using client-side software installed on the receiving device, upload a tag for the protected content (such as a tag that is or is associated with the DSI of the sending handset) for authentication on a host server. In embodiments both a DSI of the receiving handset and a DSI of the sending handset may be used to manage rights of the users to play the content.

Depending on terms that may be set between the authentication entity (such as the DSI platform 100) and the rightful distributor of the protection enabled content, only information that is necessary for authentication may be submitted to the authentication entity. Limiting the information sent to the authentication entity may restrict what the authentication entity knows about the user's digital rights. In an example, authentication deal terms are solely on a transaction percentage/fixed fee basis. Therefore, information transferred to an authentication entity may only include financial transaction information related to the authentication entities fee structure. As such, each time a transaction takes place in which the authentication entity is entitled to a fee, the authentication entity would be notified only of that specific information which allows the authentication entity to determine and verify the revenue owed to the authentication entity. In another example, the authentication entity has a financial institution as a partner website. The authentication company and the financial institution will work out a deal such that for each user that the financial institution wishes to authenticate to access their account information, the authentication company will charge 10 cents annually. In this example, the authentication company would receive data pertaining to each time a user account is created and each time one is deleted. No other information would flow from the financial institution to the authentication entity. In another example, the authentication entity has a completely non-financial deal with an online site that provides content to registered users (e.g. a social networking site, an online version of a newspaper that charges for subscription, a pure-online newspaper, a content provider to registered users, and the like). In this example, the authentication entity may receive user information, such as the user's real name and identity or a user identity determined from a mobile DSI associated with the authentication request. The information might include entertainment interests, demographic information, and the like. The selected user information can be used in a multitude of ways and can be a set of market data, the value of which could be further enhanced through operational combinations using processes described herein.

Mobile DSI-enabled personal online account digital rights management may be associated with the methods and systems herein described. Users may be allowed, on their own discretion, to limit access to an online facility, such as certain personal online accounts (e.g. email, social network, bank, brokerage, etc.) so that those accounts may only be accessed if a mobile handset, which users assign at their own discretion, is nearby the device through which access is attempted to one of the personal accounts. Users may identify specific DSIs or specific users that may be associated with a mobile handset DSI. The specified users or DSIs may be maintained by an authentication entity so that requests to access to a DSI protected account may be authenticated based on proximity of one or more user specified mobile handsets to the device through which the request to access the online facility is made. An authentication response may be provided from authentication functionality embodied in the authentication entity, or in an entity associated with the DSI protected account. Based on the response, access to the online facility may be allowed or denied. In addition, the user may specify DSIs that must not be in proximity to the requesting device to enable authenticated access to the account.

The methods and systems herein may allow users, on their own discretion, to limit access to certain personal content (e.g. documents, pictures, video, and the like) accessible through an online facility so that the protected personal content, wherever it resides (e.g. an online social network, online photo album, online video server) may only be accessed by a user as assigned by the personal content publisher/owner. In an example, Mary allows her mom and her brother to view online photo album X while allowing her brother to access online photo album X and online video Y. When Mary's mother and brother seek access to online photo album X, they are granted access when one or more of the mobile DSIs associated with Mary's mother or brother are in proximity to the device requesting access. However, only when Mary's brother's mobile device DSI is within proximity to the requesting device, will access to video Y be granted. Access is granted using similar DSI authentication methods described herein that may include an authentication server, an authentication, tagging of protected content, and the like. Authentication may include matching the DSIs of devices in proximity to a list of authorized users by determining a user associated with each DSI to be matched. The matching may be performed by an authentication entity. Alternatively, the server-side software may receive a list of authorized DSIs (such as from an authentication entity) and may perform the matching. Personal authentication services may be offered to individuals for a fee, may be provided as part of a DSI based digital rights management protection package, or may be provided free of charge to individuals. Alternatively, content providers or servers may pay a fee to use DSI-based authentication services.

DSI-based user identification and profiling may allow layered viewer-specific advertising. Layered user-specific television, radio, and/or internet advertising support another layer of advertising within an existing advertising space. This may be embodied essentially as multiple configurable or selectable images essentially in a stack that is selectable by the user or by display device software based DSIs of devices that are in proximity to the display device. Layered user-specific advertising may include the ability to split up each advertisement frame among multiple ads or among various categories of ads so that a reconstituted advertisement based on the user-specific identification/authentication profiles of the viewers who are in front of the display device (or audio device) can be presented to the user(s). Layering may enable various portions of an advertisement to be customized and targeted to the viewers local to a presentation device.

Layered user-specific advertisements may also include a concept of a blanket advertisement that is targeted using general demographics based on the user profiles determined from the DSIs in viewing proximity. The blanket advertisement may be replaceable by the presentation device by an advertisement that is targeted to specific viewers. In an example, two families viewing the same television program through two different set-top boxes may see different advertisements. One family may have viewers with no mobile devices in proximity to the set-top box (or with devices providing DSIs that have no determinable association to targeted advertising) so that family may view the blanket advertisement. The other family may include viewers who are carrying mobile devices that present DSIs that can be determined to satisfy a requirement for a targeted advertisement. This family may not be presented the blanket commercial. Instead the set-top box (or server connected to the set-top box) may present a targeted advertisement in place of the blanket advertisement. While this concept supports layering of entire advertisements, it also extends to layering portions of an advertisement.

An advertisement may be composed of layers, frames, regions, elements, primitives, and the like that may be customizable through a targeting process. One or more of these layered portions of an advertisement may be customized with targeted content based on the determined viewers of the advertisement. In an example a sporting goods store advertisement may allow targeting various individuals by allowing products included in the advertisement to be user specific. While a base of the advertisement may be common to all presentations of the advertisement, a viewer with a usage profile that indicates the user has an interest in golf may be presented with golf product promotions, whereas a viewer determined to have an interest or have expressed an interest in basketball may be presented with basketball related product promotions within the advertisement, such as during the same advertisement on the same internet-enabled device such as a television connected to an internet-enabled set-top box.

When more than one viewer with differing targeting criteria is viewing output from the same set-top box (or internet connected device), the layering may allow more complex targeting. In an example, an advertisement for a sports drink may include images of a person active in a sport who needs a sport drink to be refreshed. The sport images may be targeted to one of the viewers, and the sport drink may be targeted to another of the viewers, thereby presenting an advertisement with relevance to both viewers.

Figure 18:
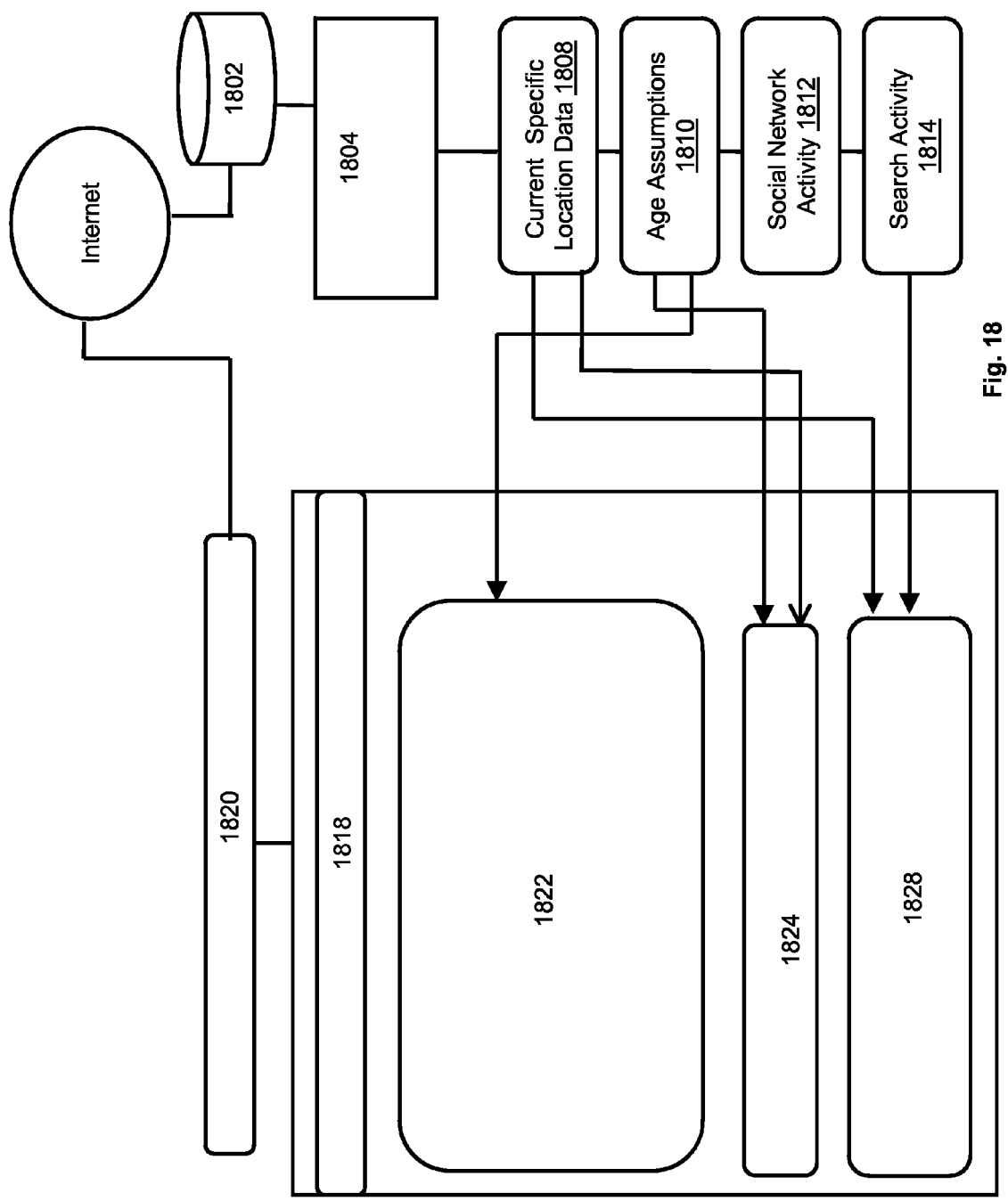
FIG. 18 depicts layered targeted advertising based on one user profile.
Figure 19:
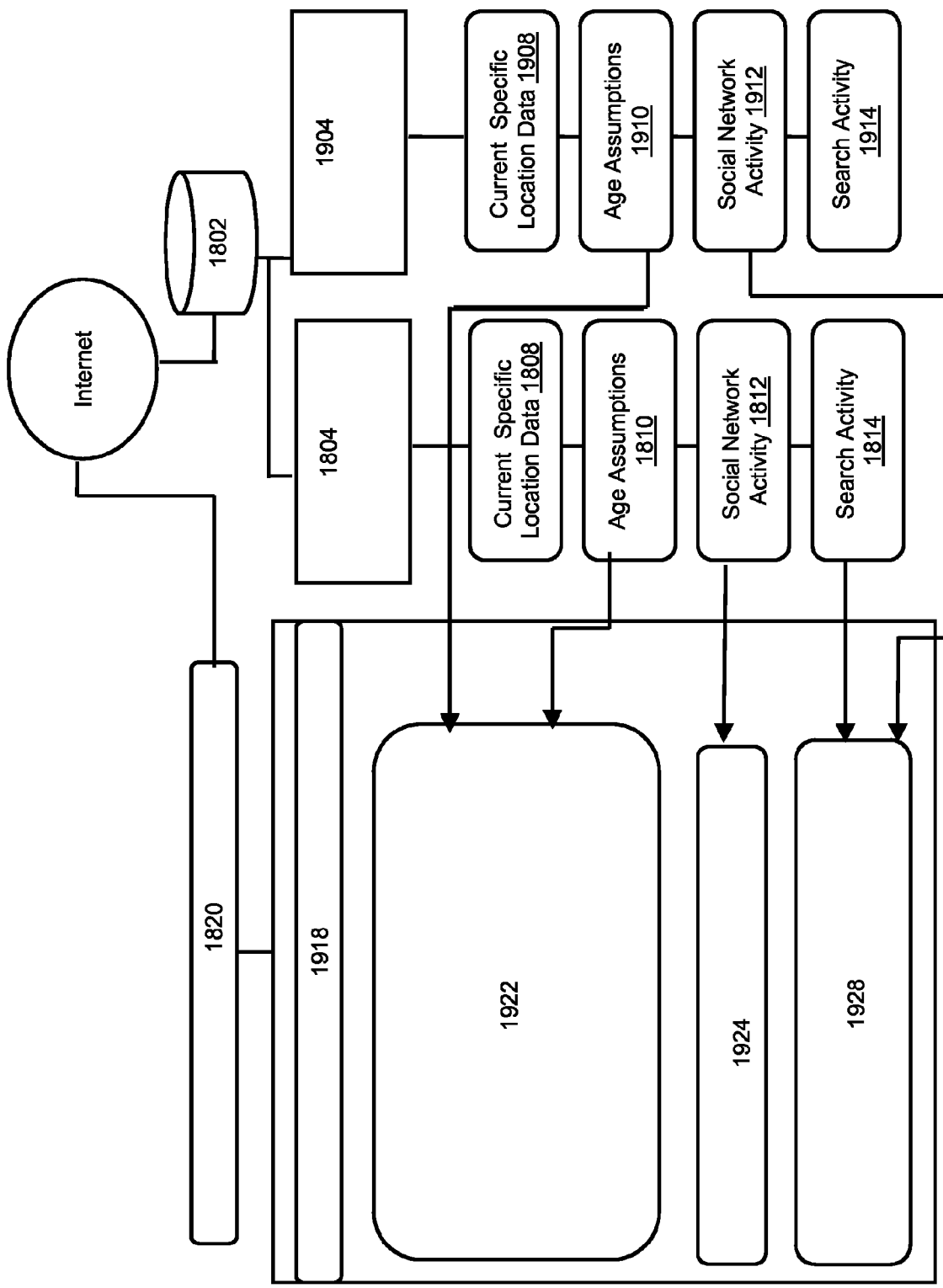
FIG. 19 depicts layered targeted advertising based on two user profiles.

FIGS. 18 and 19 depict layered user-specific advertisements. FIG. 18 depicts a single determined viewer receiving targeted layered advertising. A host server 1802 may determine information about the viewer by accessing the corresponding user-specific authentication/identification profile and usage data 1804. From the profile data 1804 and other information from the device such as location information 1808 (which may be derived from gps receiver/cellular/radio wave triangulation certain advertisement targeting criteria may be established, such as age assumptions 1810, social network affiliations 1812, and search activity 1814. The embodiments are exemplary of some categories of information. The categories of information or where that information is from, or how it is categorized is not bounded or limited by these examples. These several examples only show the potential complexity of mixing and matching these categories with various viewers under various situations, such as layered, embedded, combined, or other scenarios. The advertisement targeting criteria may influence what information is presented in the layered portions of the advertisement 1818. The advertisement 1818 may reflect a composition as determined by the internet-enabled device and the various media formats it may receive? (e.g. set-top may receive video, images, audio; radio may receive audio; outdoor LCD may receive video, images and the like. The layered objects may represent the finished, delivered components of the advertisement 1818 as determined by the various targeting mechanisms described here such as by passing targeting information through the internet to the display or audio device 1820 on which the targeted advertisement 1818 is to be presented. In the embodiment of FIG. 18, age assumptions 1810 may be used to determine the main advertisement 1822 to be presented. Age assumptions 1810 and current location 1808 may determine which local establishment 1824 to present, and current location 1808 combined with search activity 1814 may determine which product or service 1828 associated with the local establishment 1824 to present.

FIG. 19 depicts targeting layered advertisements based on more than one viewer. In the embodiment of FIG. 19, age assumptions 1810 and 1910 from the different viewers contribute to determining the main advertisement 1922 to be presented. Social networking 1812 from a first viewer may determine which local establishment 1924 to present, and search activity 1814 if the first viewer may be combined with social networking 1912 of the second viewer to determine which product or service 1928 associated with the local establishment 1924 to present.

Figure 20:
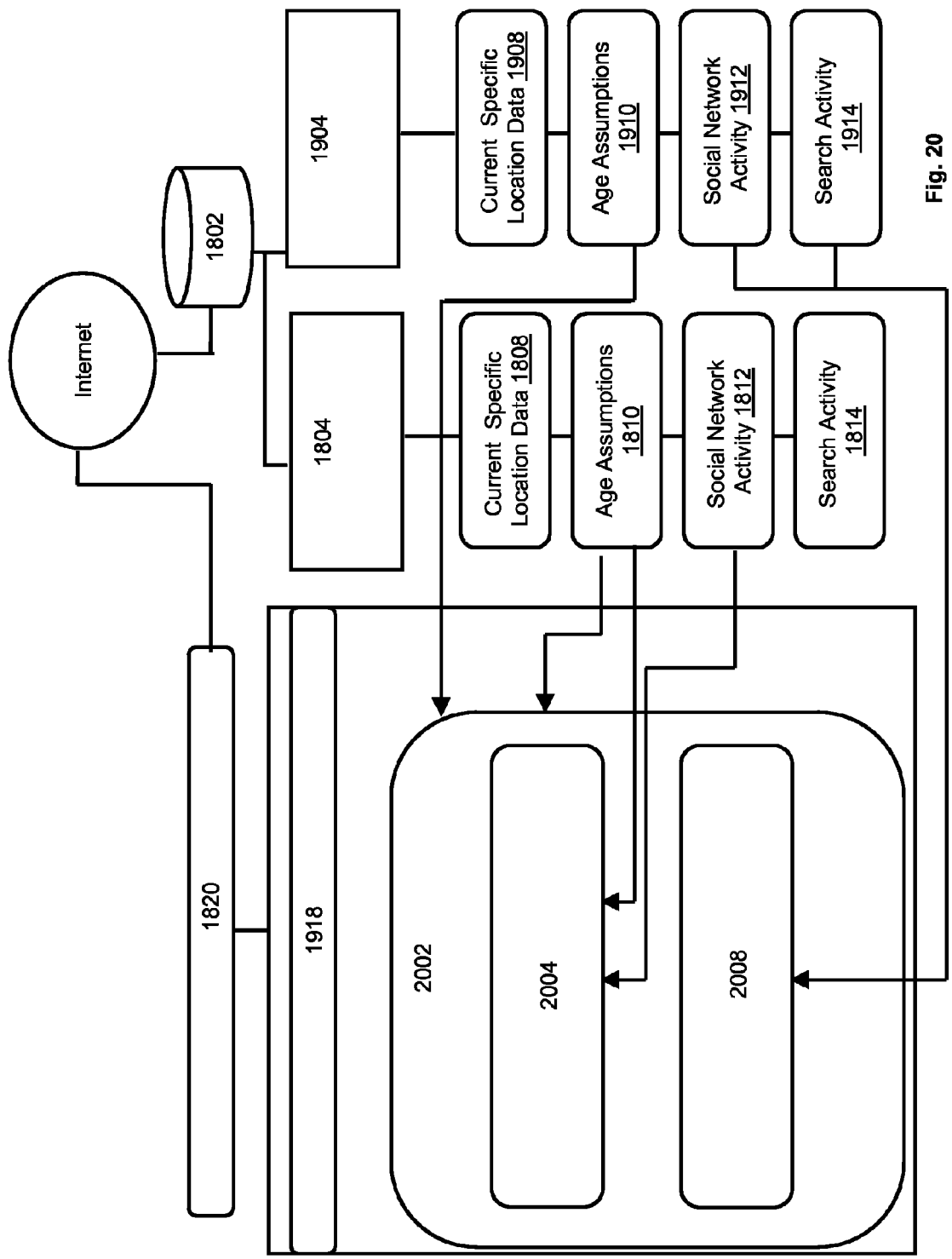
FIG. 20 depicts dynamic content placement in association with layered targeted advertising based on two user profiles.

FIG. 20 depicts a targeted advertising scenario in which portions of content, such as a movie, television show, video, or other non-advertisement specific content may support creating dynamic embedded content advertising. Product placement in movie production is a high value market that can be significantly enhanced through targeting the product placement. In targeted product placement, specific items within the content being viewed, such as a soda bottle, a store sign may be dynamic and may be configurable to suit the viewer-specific audience as determined by the viewer's corresponding user-specific authentication/identification profiles derived from the viewer's DSI-based identity. In an example, during a given television program, three gentlemen walk into a restaurant. However, when viewers watch this content, the storefront of the restaurant may change to reflect an actual local restaurant nearby the physical location of the viewers. This may further allow for interactivity that allows the viewer(s) to reference this actual local restaurant's current menus to proceed towards a transaction for a delivery of food, a reservation for a meal, and the like. In another example, a character is drinking for a soda bottle. If the viewer has a demonstrated interest in drinks other than soda, the soda bottle may change to be a branded water bottle, a protein-drink, and the like.

In FIG. 20, age assumptions 1820 and 1910 of the two viewers may identify a portion 2002 of the content in which the product placement may occur. A first product placement

2004 may be determined based on the first user age assumptions 1810 and online social networking 1812. A second product placement 2008 may be determined based on a second user's social networking 1912 and search activity 1914.

The mobile device providing the DSI may be used as an interactive controller, such as a remote control or user input device to interact with the user-specific targeted advertisements. Data inputted by the viewers may be anticipated using predictive algorithms that may take into consideration the user-specific authentication/identification profile that may be retrieved once the mobile DSI is extracted. The range of interactivity may be based on aspects of the user-specific authentication/identification profile corresponding to the extracted mobile D SI. Advertising interactivity may allow a viewer to respond to a television, electronic multimedia display, radio advertisement, and the like via inputting information into the mobile handset which is then wirelessly transmitted to the device controlling the presentation of the advertisement. Another way of connecting the user inputted responses to the interactive advertisement is by interfacing the mobile handset to the device controlling the interactive advertisement through a network such as a cellular network and the Internet. Example use of a mobile handset interacting with an interactive targeted advertisement may include book marking advertisements, referring advertisements to friends, responding to interactive games, polls, chat services, and the like. However, when viewers watch this content, the storefront of the restaurant may change to reflect an actual local restaurant nearby the physical location of the viewers. This may further allow for interactivity which allows the viewer(s) to reference this actual local restaurant's current menus to proceed towards a transaction for a delivery of food, a reservation for a meal, etc User actions may be predicted based on a combination of the presented targeted content, such as an advertisement and aspects of the user-specific authentication/identification profile. In an example, usage data associated with a viewer may indicate that the viewer may be likely to forward relevant content to one or more members of his social network. Based on this usage data and based on the content of the targeted advertisement, a list of likely recipients of the content may be prepared so that the viewer may easily interact through the mobile handset to forward the content to the likely recipients. The list of likely recipients may be based on usage data—such as based on frequency of including one or more recipients in prior forwarded advertisements. The list may be based on an association of aspects of the targeted content to user-specific profiles of users in the viewer's online social network. Many other associations are possible in determining what type of interaction may be predicted for the viewer of targeted advertising.

Figure 21:
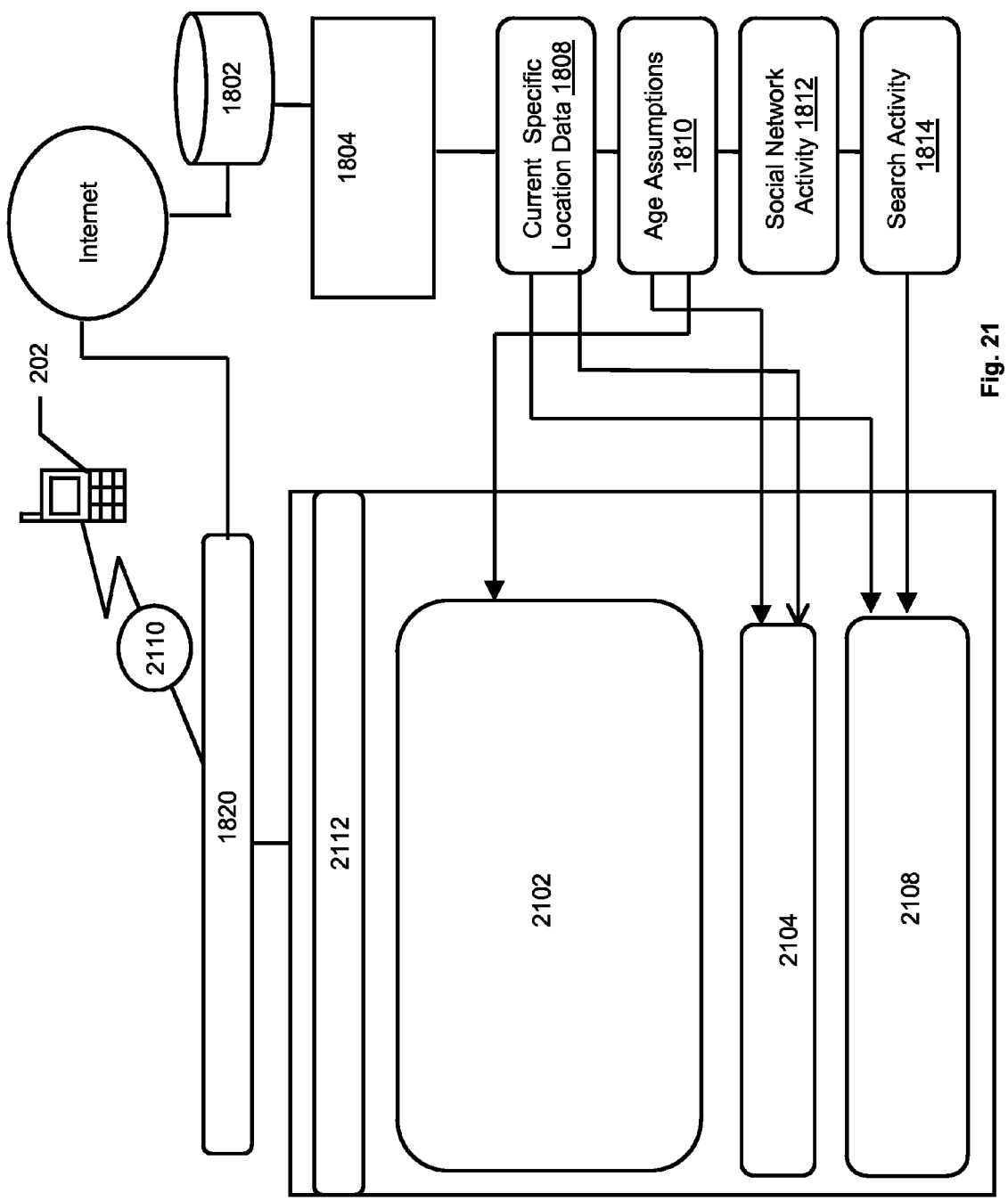
FIG. 21 depicts using a mobile handset to interact with an interactive targeted advertisement presented by a set-top box on a television

FIG. 21 depicts a mobile handset 202 interacting with an interactive targeted advertisement 2112 by wirelessly transmitting a command 2110 to an internet connected device that may control the presentation of the interactive targeted advertisement 2112. The interactive targeted advertisement 2112 may include interactive portions 2102 and 2104 that maybe configured to present predicted interactions as described herein. The interactive targeted advertisement 2112 may also include one or more interactive portions 2108 that may not be predicted interactions. Alternatively portions 2108 may be based on aspects of the user profile 1804 and may not be interactive.

Figure 22:
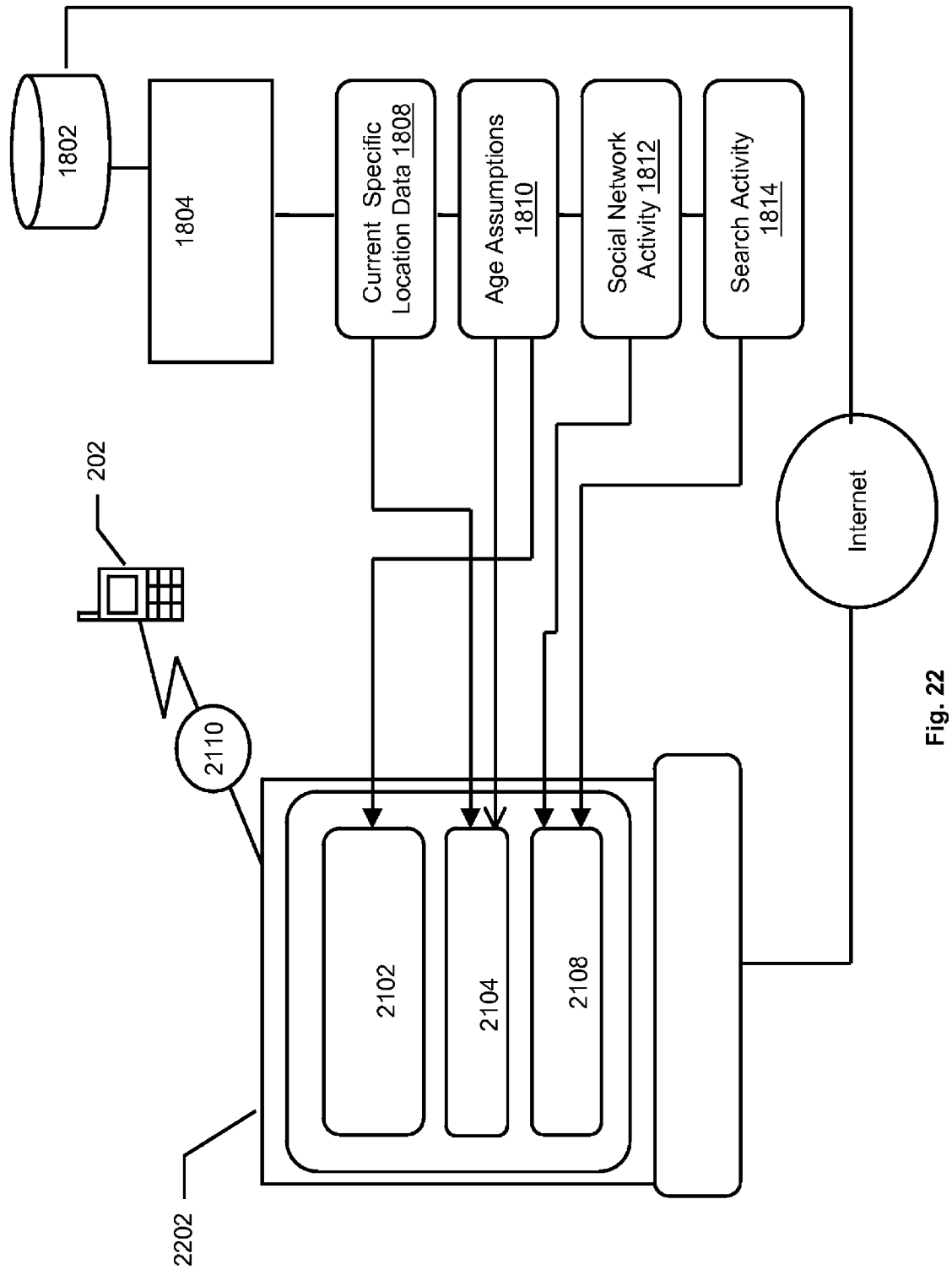
FIG. 22 depicts the embodiment of FIG. 21 wherein the advertisement is presented on a personal computer.

FIG. 22 depicts an internet connected computer 2202 that may receive and present advertisements that are interactive targeted, layered, embedded or a combination of these and the like for a viewer determined on the proximity of mobile handset 202.

Figure 23:
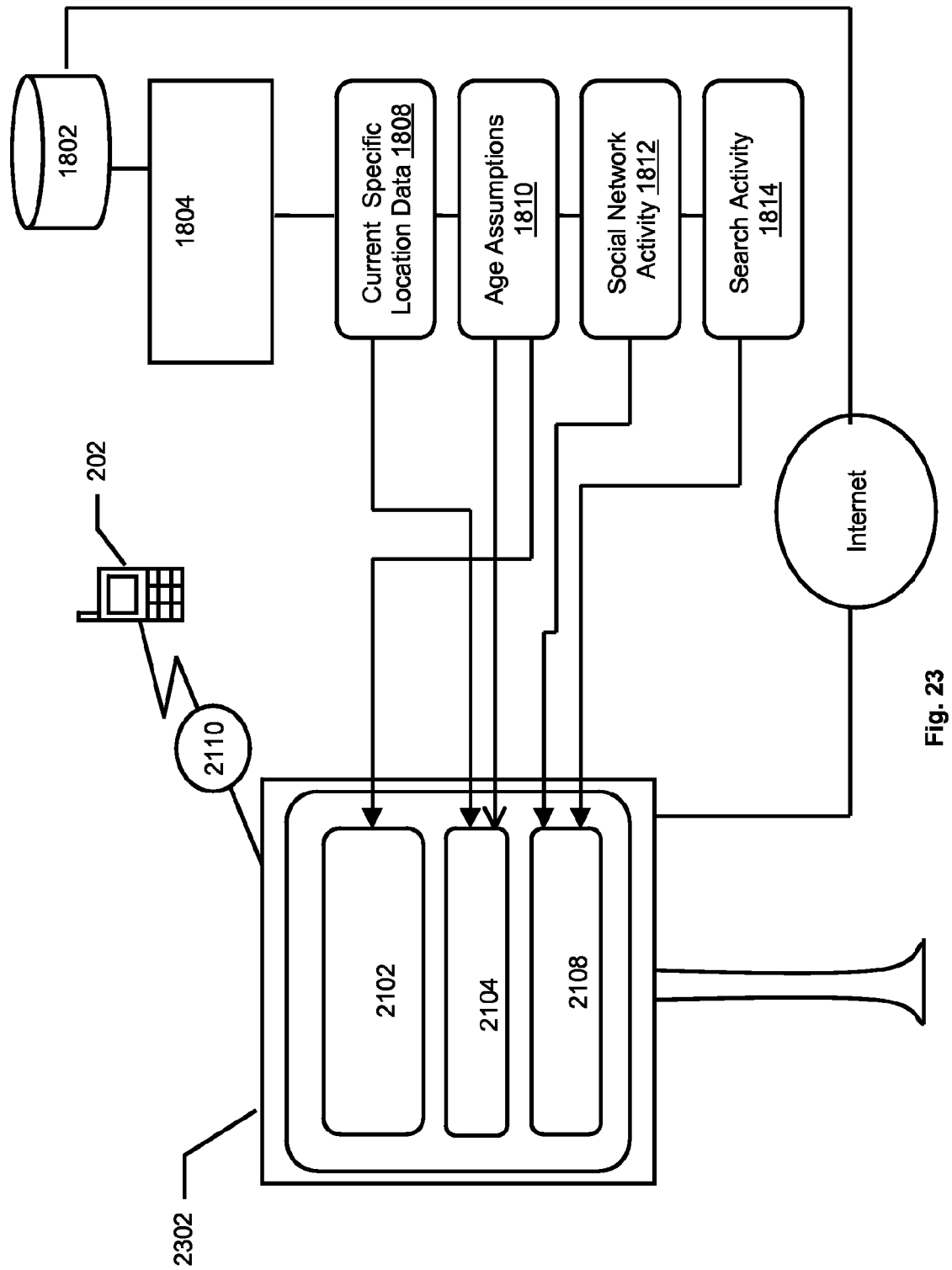
FIG. 23 depicts the embodiment of FIG. 21 wherein the advertisement is presented on an electronic multimedia screen.

FIG. 23 depicts an internet connected electronic multimedia display 2302, such as an outdoor display, a window display, a display at a supermarket checkout, a point of sale display, a kiosk (e.g. in an airport), a display in an airplane, a display in a taxi or public transportation, and the like. The interactive electronic multimedia display 2302 may support interactive targeted advertising, gaming, shopping, social networking, and the like. The predictive interactions presented on the electronic multimedia display 2302 may provide opportunities to engage the viewer on a temporary basis, such as when the viewer passes by a store display window, or when the viewer is riding in a taxi, and the like.

Figure 24:
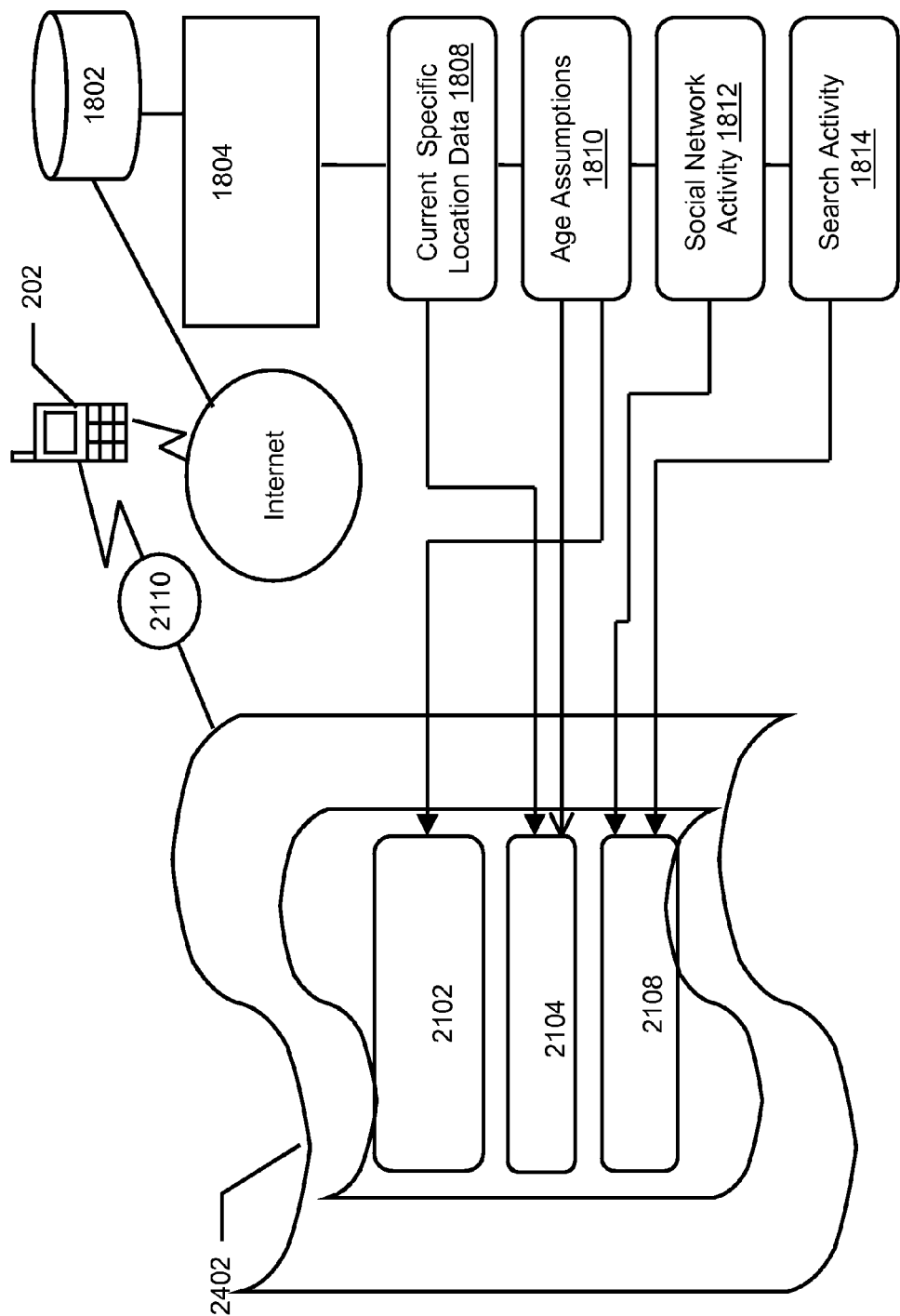
FIG. 24 depicts an alternate embodiment of FIG. 21 wherein the advertisement is presented on a flexible electronic presentation media.

FIG. 24 depicts flexible electronic presentation media 2402 (flexible active-matrix display modules for 'take anywhere, read anywhere' electronic reading), such as products available from Plastic Logic Limited connected to the internet and interacting with a mobile handset 202. In embodiments, the flexible electronic presentation media 2402 may be a handheld, portable replacement for the internet connected electronic multimedia display 2302 depicted in FIG. 23. In the embodiment of FIG. 24, the flexible electronic presentation media 2402 may not include an independent internet connection connected directly to the device 2402 or the device 2402 may use an existing nearby internet connection, such as a WiMax or other cellular Internet connection, that is available through the mobile handset 202. The relaying of the Internet connection from a nearby internet-connected device such as the mobile handset may be facilitated through short distance wireless communication (such as WiFi, Bluetooth, WUSB, UWB, and the like) between the device 2402 and the nearby internet-connected device such as the mobile handset. In such a scenario, the content, such as targeted advertisements, presented by the flexible electronic presentation media 2402 may be transmitted from a host 1802 through the internet to the mobile handset 202 and to the media 2402. The features and characteristics described herein that may be associated with more than one mobile handset being detected within a viewing proximity of a device, such as the flexible electronic presentation media 2402 may be applied to the embodiment of FIG. 24.

The presentation devices depicted in FIGS. 21-24 may alternatively be audio only playback devices, such as an internet connected radio, digital music player, and the like. Audio content, including audio advertisements may be targeted to be played for a listener within listening range of the device much like advertisements may be targeted to a viewer in appropriate proximity to the presentation devices of FIGS. 21-24. An appropriate proximity may partially be determined by the content being displayed to the presentation device which may further be determined by the capabilities of the internet-enabled device. Interactive targeted audio advertisements may be played and interacted with through the user's mobile handset by providing interactive signals such as an announcement to press a button on the handset.

Figure 25:
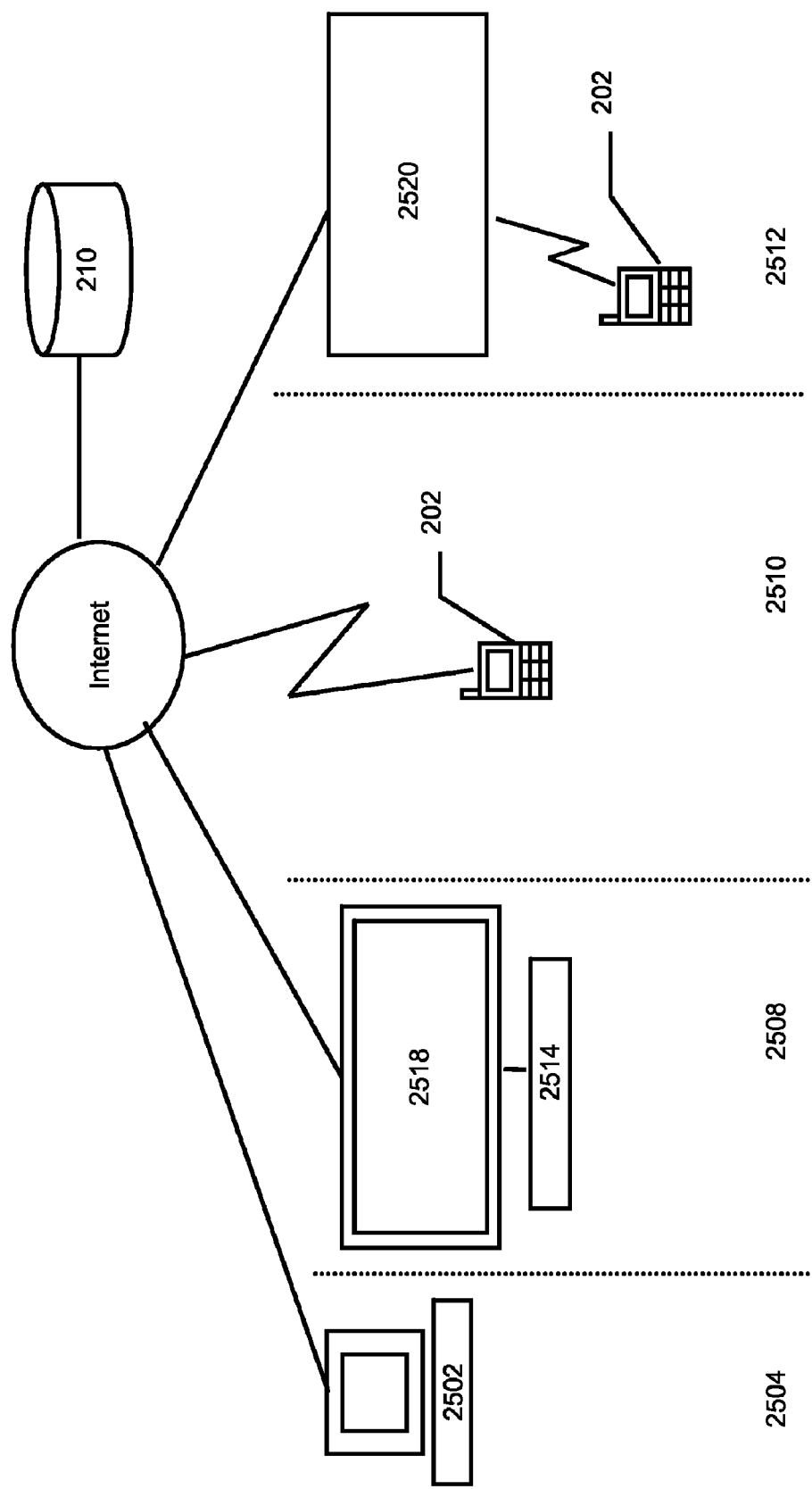
FIG. 25 depicts a timeline representing real-time accumulation of usage data impacting targeted advertising.

FIG. 25 depicts a timeline of internet interactions or usage that maybe associated with a user so that the cumulative user interaction experience may be applied to targeted advertising and other services through the timeline. In this way, interactions occurring at time 2504 may impact advertising targeting, interaction prediction and the like at times 2508, 2510, and 2512.

In FIG. 25, a user engages various Internet-connected devices throughout several periods. The cumulative and real-time nature of the user-specific authentication/identification profiles allows advertisements sent to the user via different platforms to reflect all of the user's past recognized Internet usage activities. In this way, FIG. 25 depicts how a time-sensitive, device-agnostic internet protocol-based reactive relaying advertising platform may operate. The platform may operate so that while a user is watching content on a television, if the user also demonstrates interest in a particular product or product category of a DSI tracking enabled website (e.g. prior to or simultaneously with watching content on a television, an advertisement could be delivered on the television in immediate response to his Internet usage activity. Similarly, if a user is walking past an electronic multimedia display that is equipped with DSI based advertisement delivery technology, the user may receive an advertisement that is derived from information from his Internet usage on his mobile device, such as a website that the user is currently visiting.

In the timeline depicted in FIG. 25, at time 2504 a user engages a PC 2502 with the Internet. At time 2508 the user engages a television 2518 with an internet-connected set-top box 2514. Advertisement targeting provided at time 2508 may include usage from time 2504. At time 2510 a user engages his mobile handset 202 and targeted advertising assumes usage from times 2504 and 2508. At time 2512, a user's mobile handset's DSI is wirelessly extracted by an Internet-connected Electronic Display 2520. Targeted ads sent to user at time 2512 may include usage from times 2504, 2508, and 2510. This may be accomplished by host server 210 updating user-specific authentication/id profiles in real-time, such as after every recognized Internet engagement.

Figure 26:
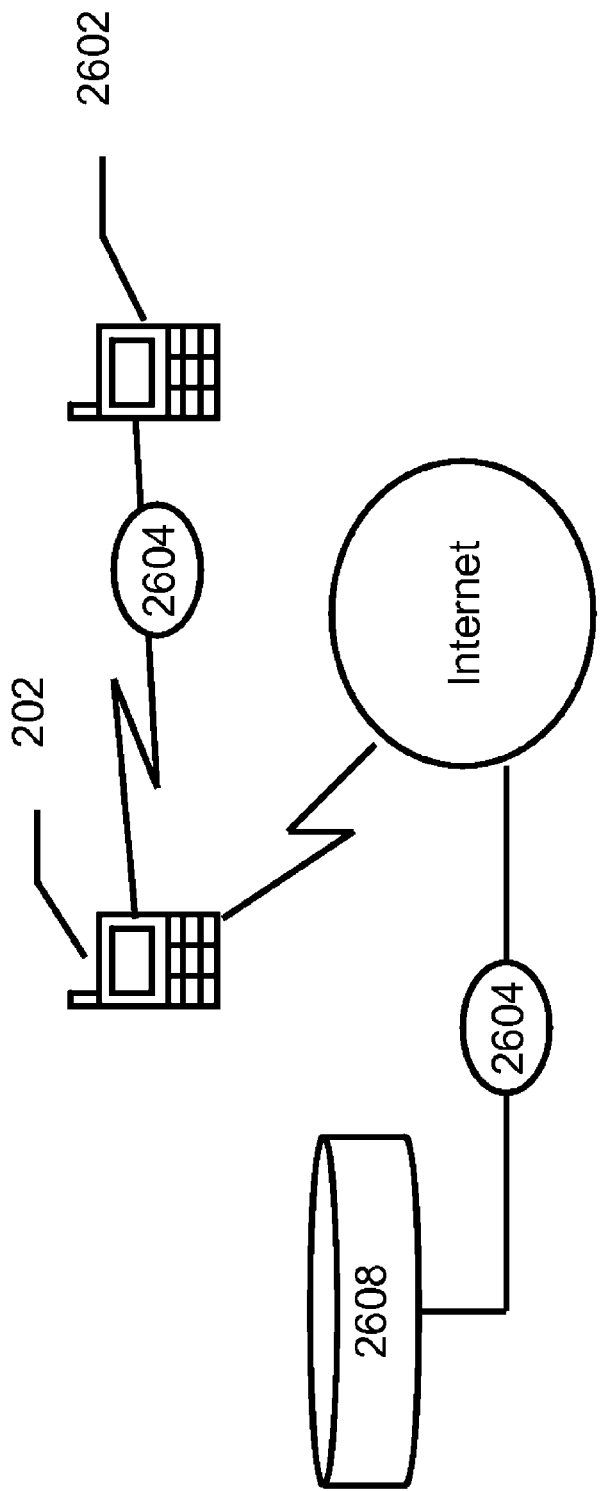
FIG. 26 depicts contact sharing between DSI-enabled wireless mobile handsets and uploading the contact to a social networking site.

Referring to FIG. 26, automatic contact information exchange between two individuals via proximate mobile handsets may be supported by the DSI-based methods and systems herein described. A user of a mobile handset 202 may initiate contact information exchange with another individual with a mobile handset 2602 who is located in close proximity to the user. After verifying that the individual wishes to exchange contact information, the two mobile handsets 202 and 2602 may exchange contact information via the short range wireless connection. In embodiments, an initiator 202 my request a receiver 2602 to accept the initiator's contact information. Alternatively, the initiator 202 may request the receiver 2602 to send the initiator 202 the receiver's contact information. Alternatively, the initiator 202 may request the receiver 2602 to mutually swap contact information.

Automatic exchange of contact information in the physical person, as described above and in FIG. 26 may be supplemented by uploading the contact information 2604 to a DSI-based authentication required online social networking platform 2608. The online social networking platform 2602 may not require DSI-based authentication. In an example John meets Sarah at a company sponsored networking event, and they exchange contact information. John immediately categorizes Sarah under a "coworkers" group. The next time Sarah signs on to her social network, she will see exactly what John's other contacts under his coworkers group sees, or what he wishes her to see specifically.

Enabling Sarah to view only the portions of John's social networking information viewable to his coworkers takes only two steps. A first step may include one of John requesting Sarah for her contact information, John accepting Sarah's request to receiver her contact information, or John and Sarah both accepting a mutual swap of contact information. A second step involves John categorizing Sarah under a pre-made group of coworkers thereby assigning her accessibility rights to his social networking profile.

Figure 27:
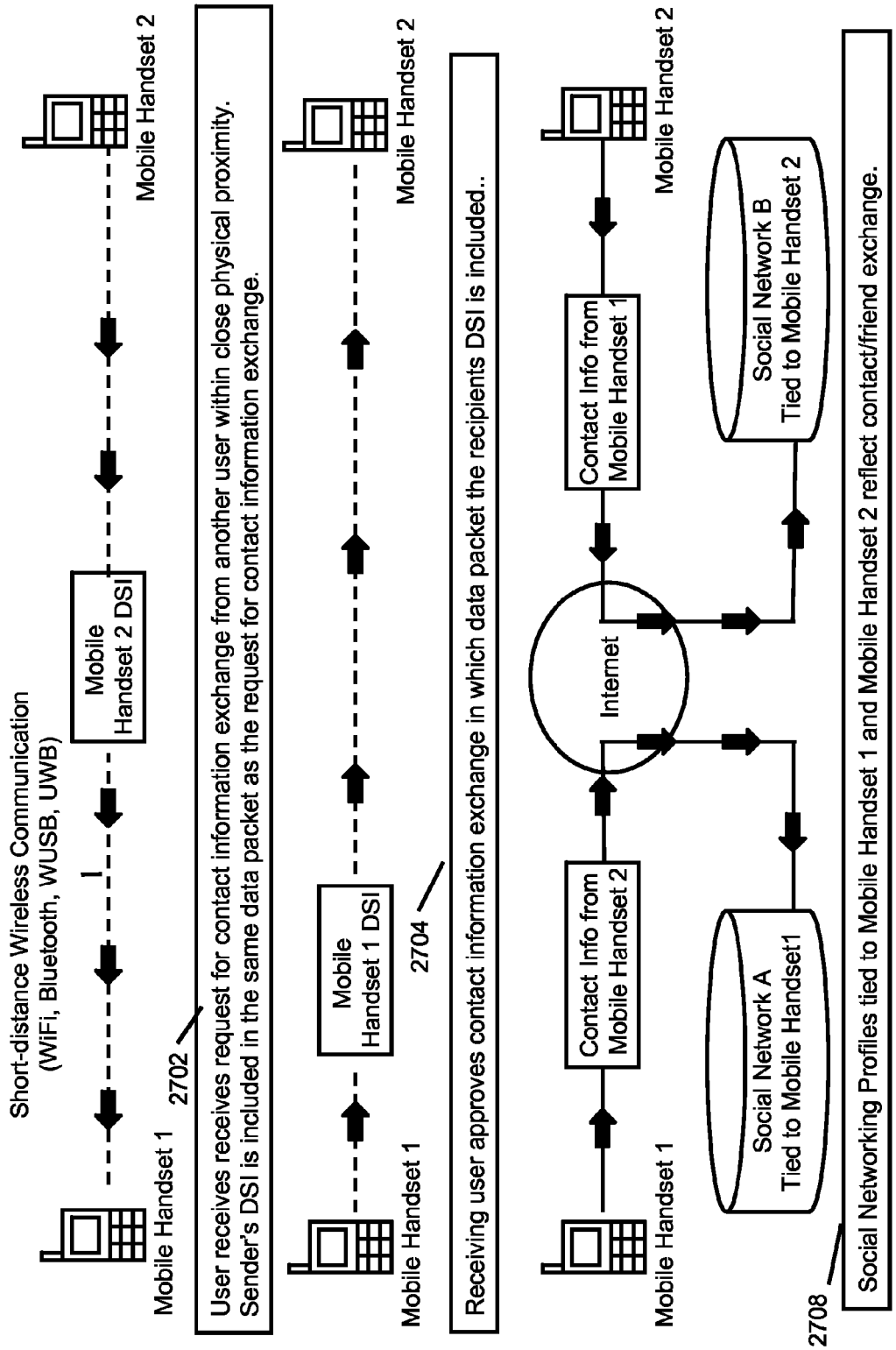
FIG. 27 shows methods and systems for automatic mobile contact information exchange and synchronization with a social network.

FIG. 27 shows methods and systems for automatic mobile contact information exchange and synchronization with a social network. At a step 2702 a user receives a request for contact information from another user within close physical proximity. A sending handset's DSI may be included in the data packet with the request for contact information exchange. At a step 2704 the receiving mobile user may approve the contact information exchange, in which case the recipient handset DSI may be included in the return data packet. At a step 2708 a social networking profile may be linked to each mobile handset and may be updated to reflect the contact information exchange.

Figure 28:
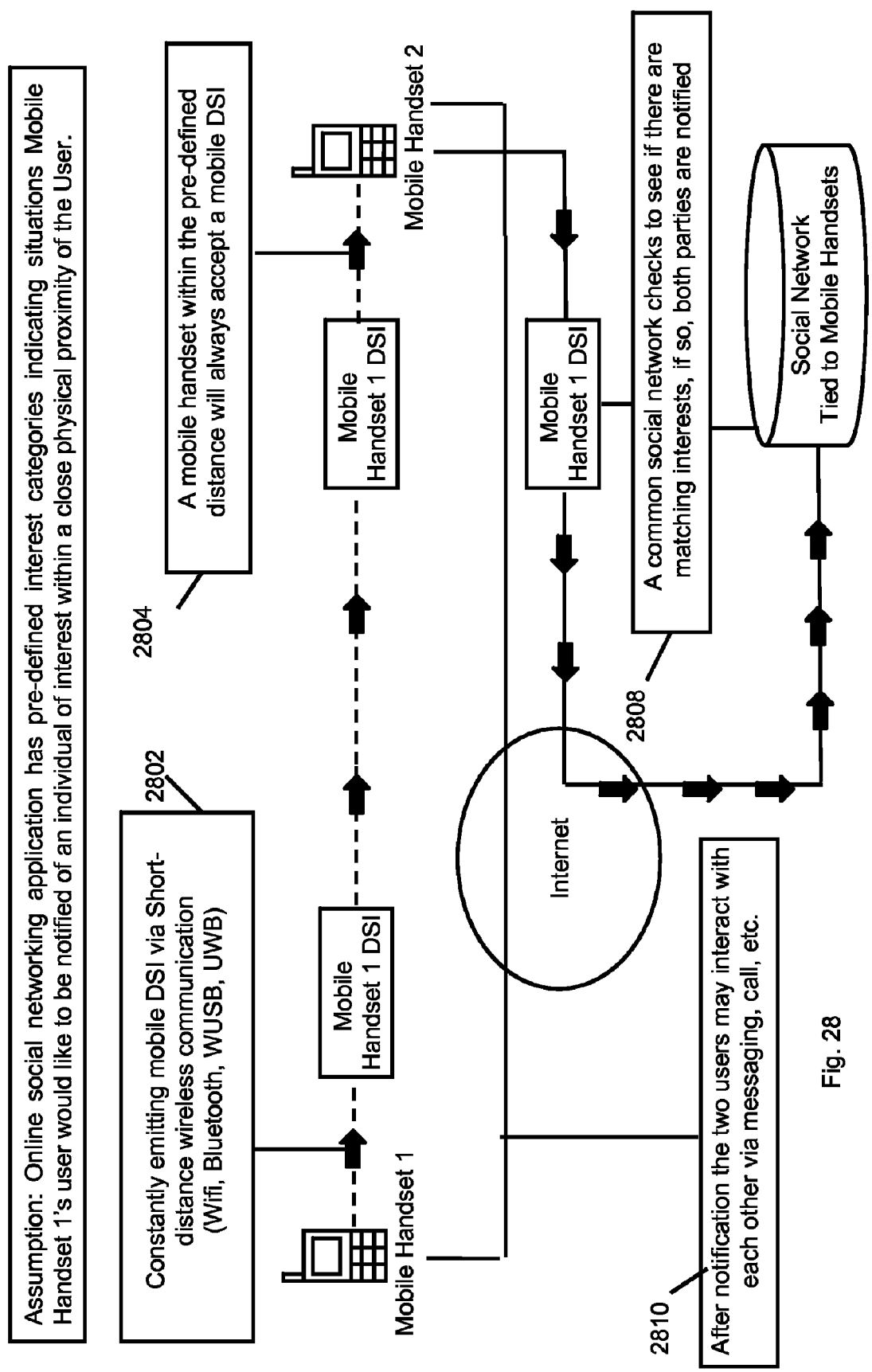
FIG. 28 shows steps for a mobile aware, automatic social networking tool.

Referring to FIG. 28, a method and system of mobile-aware, automatic, mobile social networking may alert a user of individuals who fall into one or more pre-defined social network categories or groups who are in proximity to the user. Short distance wireless communications (e.g. WiFi, Bluetooth, WUSB, or UWB) or GPS/cellular/radio wave triangulation data may be combined with DSI-based authentication/identification to identify a distance between a user and individuals of potential interest and thereby alert a user accordingly. A user who wishes to meet someone of a given background, similar hobbies or interest, or any other pre-defined category can be alerted once he is within a pre-defined physical proximity of such persons, if such persons allow it. Thus, at a step 2802 a handset may emit a mobile DSI via a short-distance protocol. At a step 2804 mobile handset within range may accept a mobile DSI of a nearby handset. At a step 2808 a common social network may check the in-proximity DSIs to determine whether there are matching interests of the handset users and notify the users. At a step 2810 the users may interact, either using the handsets or in a live, in-person interaction.

Alerting a user to the presence of a mobile handset user meeting one or more classifications, categorizations, or interest pools may be determined through a DSI based authentication process. In an embodiment, at a step 2802 software executing on a recipient mobile handset that receives a DSI from another mobile handset seeking to be alerted may run a check to see if the user of the seeking mobile handset is of any interest to the recipient. If so, the recipient may acknowledge the DSI by exchanging information such as messages, pictures, current GPS/cellular/radio wave triangulated location, and the like.

Figure 29:
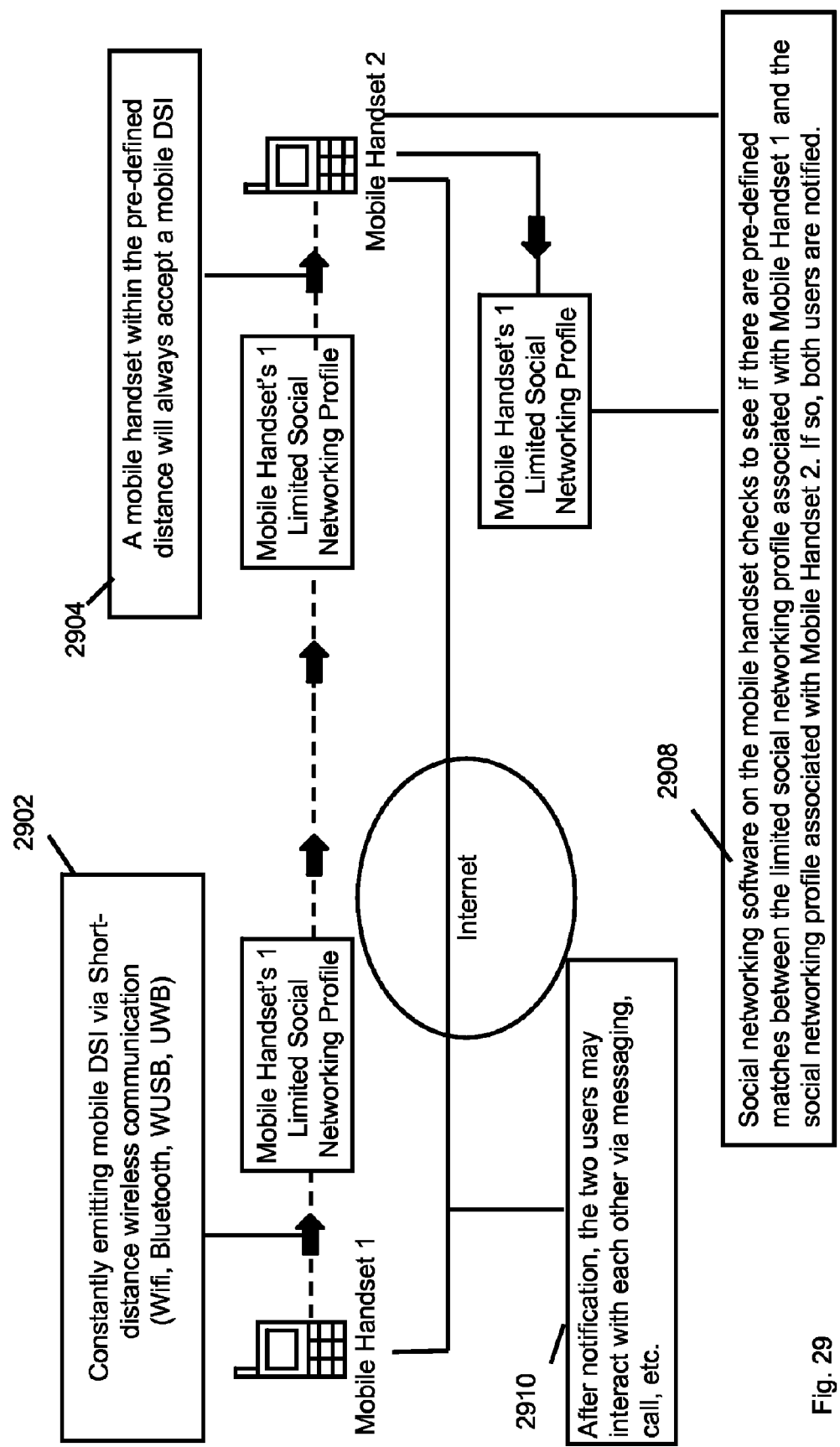
FIG. 29 shows additional details relevant to a mobile aware, automatic social networking tool.

Referring to FIG. 29, in embodiments a handset may emit a DSI at a step 2902, along with a limited social networking profile. At a step 2904 a recipient handset may accept the mobile DSI and receive the limited profile. At a step 2908 social networking software on the mobile handset may determine whether there is a match between the profile of the first mobile handset and a profile associated with the recipient handset, in which case both users may be notified. At a step 2910 users may interact.

Figure 30:
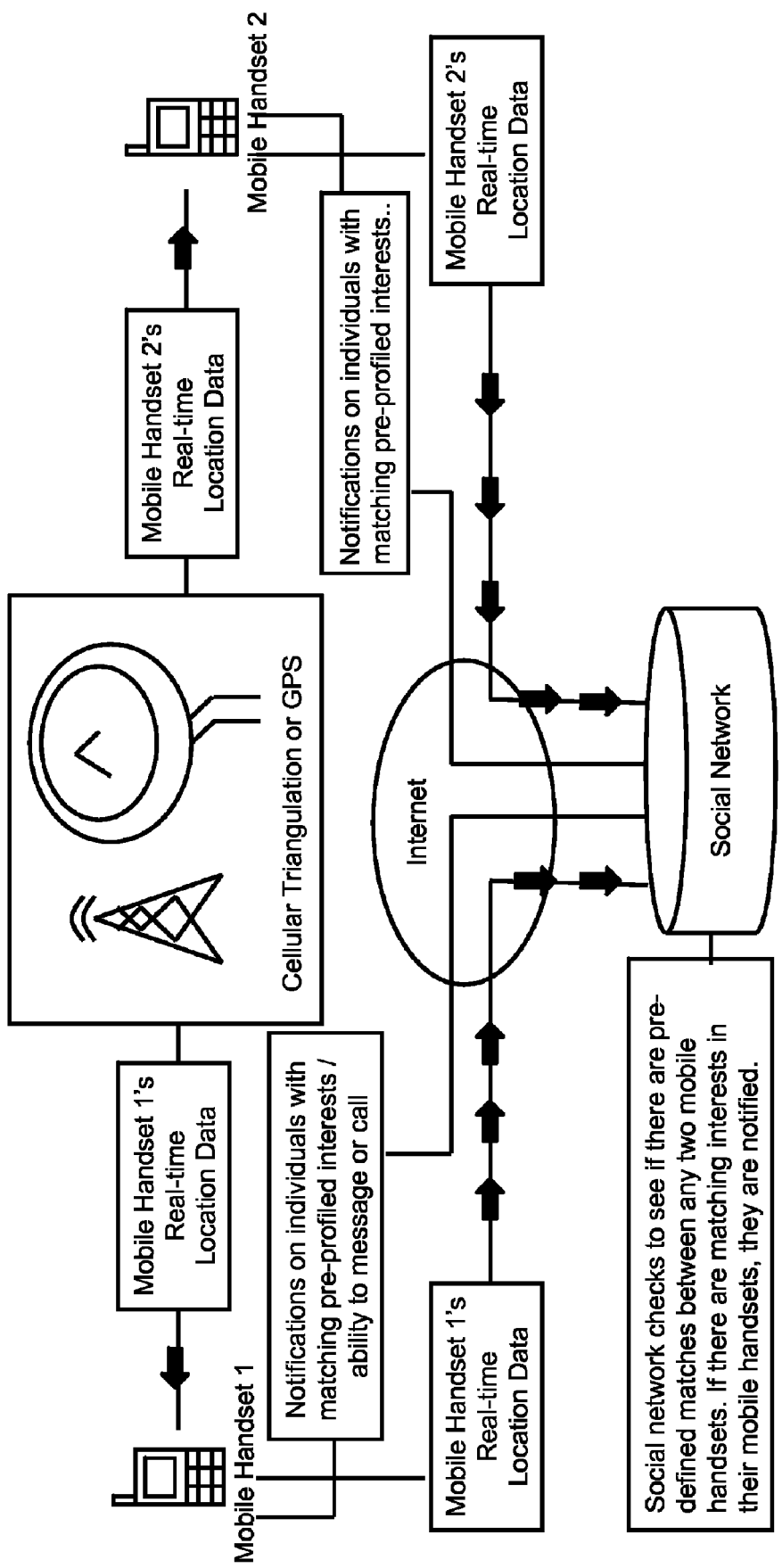
FIG. 30 shows components for a mobile aware, automatic, social networking system.

Referring to FIG. 30, in an alternative embodiment, social networking management software on a given mobile handset may monitor a GPS/cellular/radio wave triangulated location of surrounding mobile DSI-enabled handsets. The DSI of each of the surrounding mobile handsets and its corresponding social networking profile may be analyzed to determine aspects of the users of the surrounding handsets, such as interest categories, to facilitate the user of the GPS/cellular/radio wave triangulation monitoring device determining if any of the surrounding users may be of particular interest. If so, contact exchange requests may be initiated between the two mobile handsets using the short distance wireless interface or through a network such as text messaging or mobile emails is conducted today.

Physical person social networking may be facilitated by software executing on a mobile handset that transmits a limited social networking profile associated with the user of the mobile handset so that it can be received by surrounding mobile handsets. Software running on the surrounding mobile handsets may perform checks against categories, and the like as described above to determine if contact information exchange may be beneficial. If so, requests for contact exchange may be performed between proximate DSI-based mobile handsets as described in reference to FIG. 26.

Figure 31:
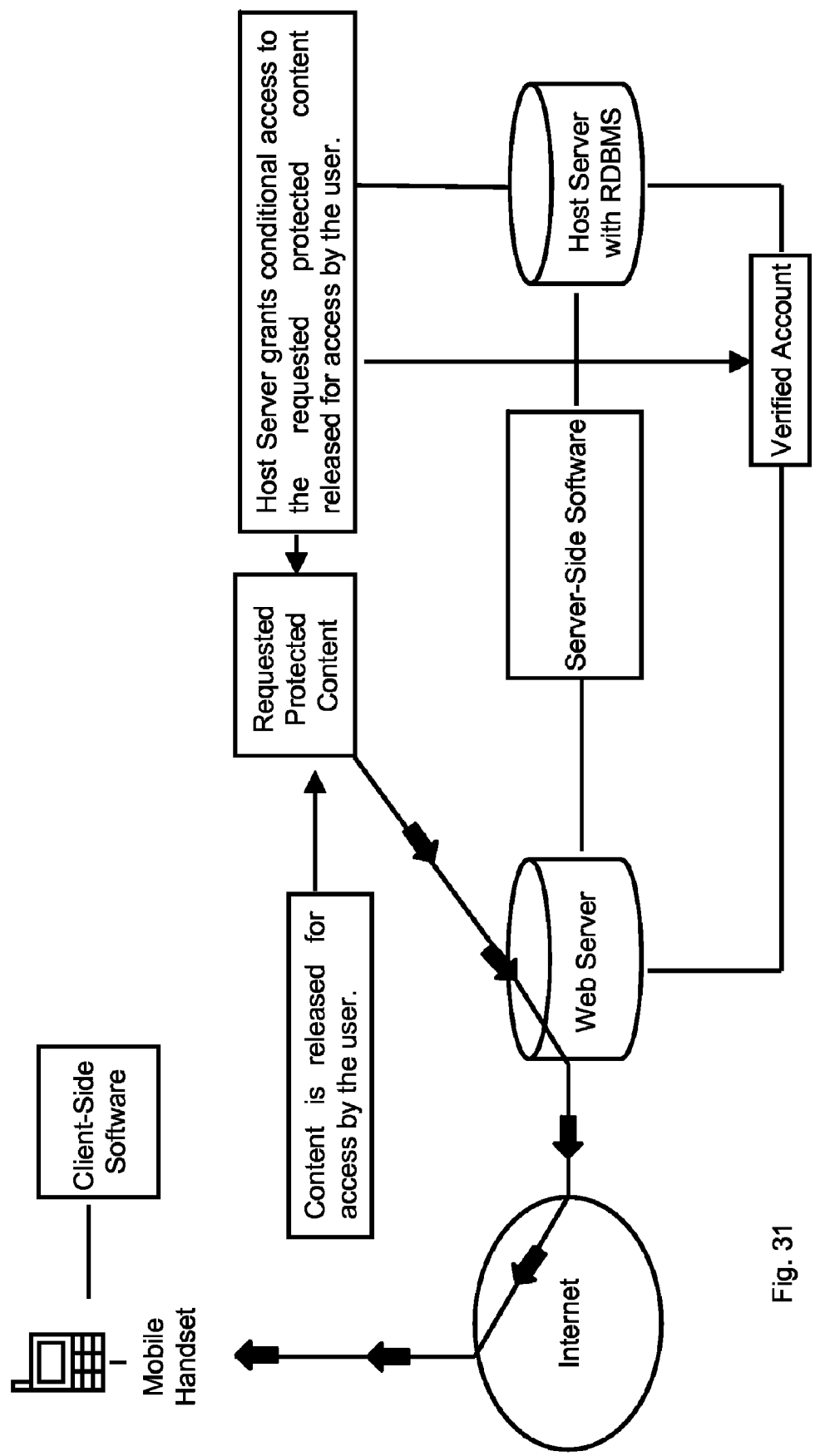
FIG. 31 shows methods and systems for managing content based on a device-specific identifier of a client.
Figure 32:
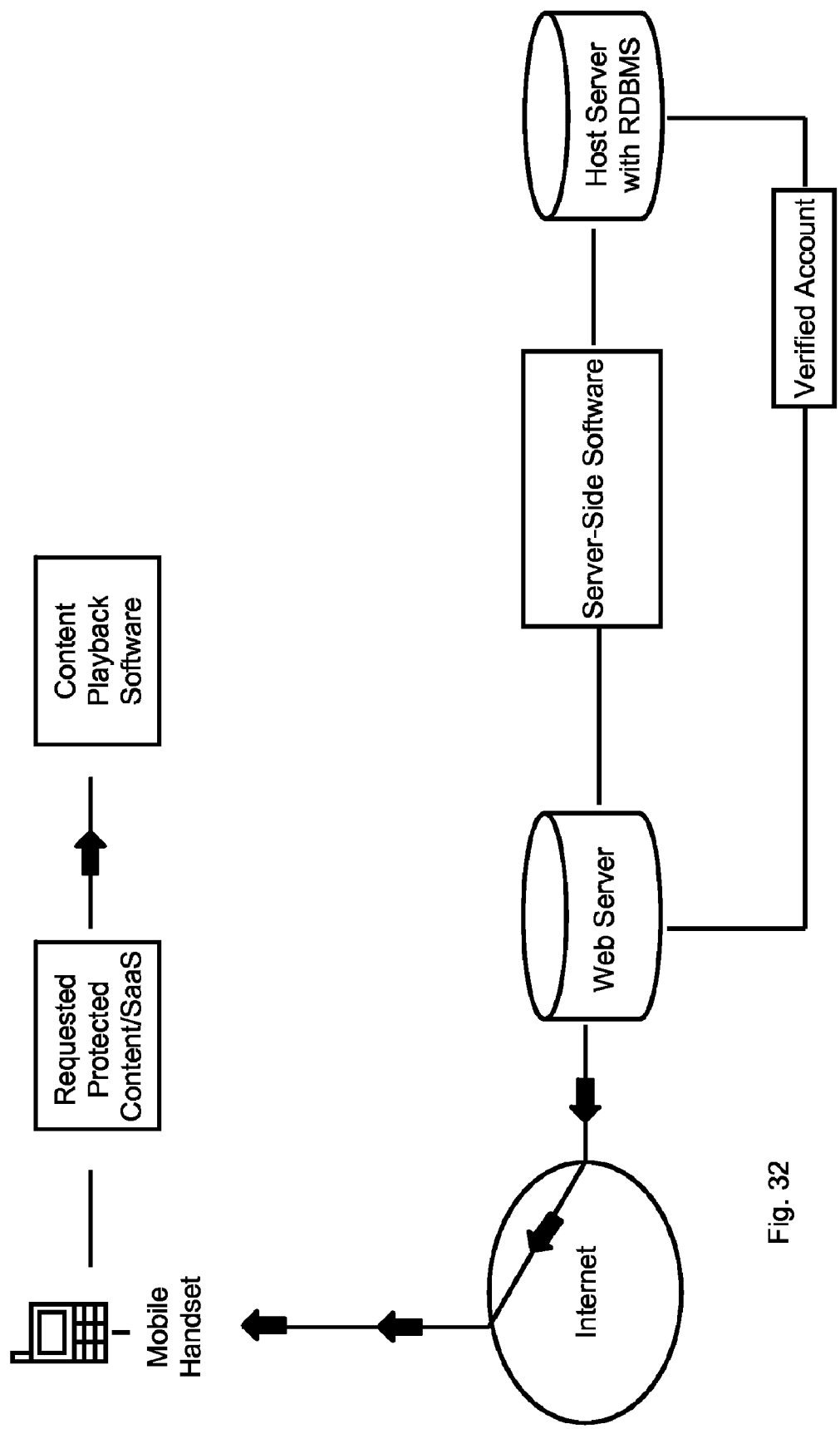
FIG. 32 shows steps for integration of content in the playback software of a user device.

Referring to FIG. 31 and FIG. 32, file-less (non-file based) content that is stamped with a mobile DSI may enable digital rights management for safe content streaming while prohibiting content transfers between mobile handsets or other computing devices. Content to be downloaded to a mobile device may be tagged with signal that represents the mobile DSI of the device to which the download is directed. The tagged content may be directly downloaded into a mobile handset and integrated with the software used to present (playback) the tagged content. The mobile DSI tag representation may be integrated with the content's metadata (or data within the content which is used to describe the content, examples include content title, copyright information, production year, etc). The downloaded tagged content may become an integral part of content that a user-specific authentication/identification profile may access. Because the content is integrated into an adapted playback application on the mobile handset, the tagged downloaded content cannot be moved to another device permanently.

Figure 33:
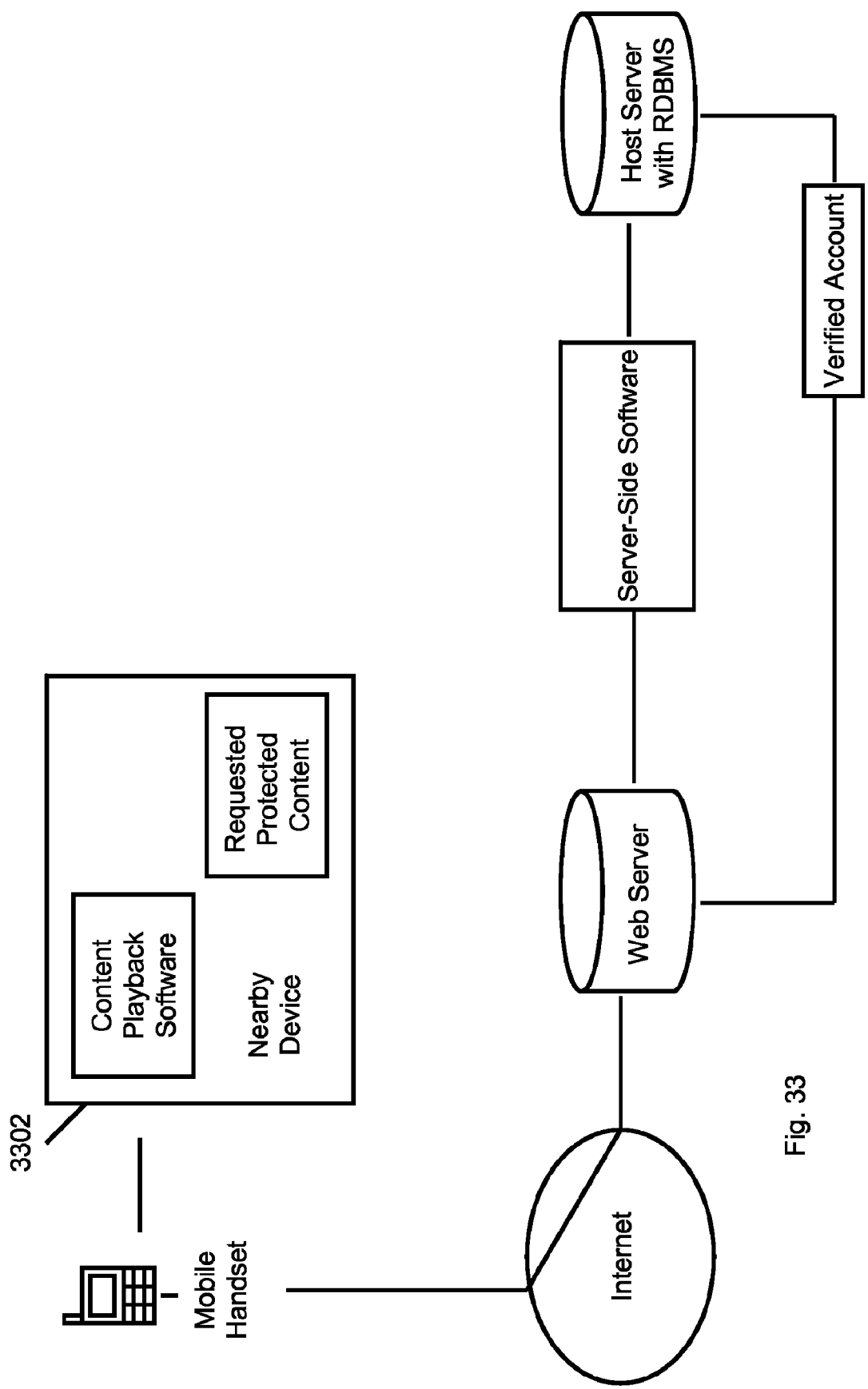
FIG. 33 shows downloading and integration of content into playback software of a user device.

Referring to FIG. 33, some access to the tagged content, such as for temporarily streaming to nearby playback devices (e.g. television, PC, another mobile handset) may be provided by the adapted playback software but may include time limitations on access to the content by the receiving device. The receiving or secondary device may upload the mobile DSI through the Internet onto an authentication server for the purposes of verifying if content playback is within the legal limits of its use. In embodiments downloaded protected content cannot be copied from the mobile device and moved somewhere else, but using content playback software the user may stream the content to a more desirable platform or nearby device 3302, such as a nearby larger electronic display (such as a network-enabled television screen), a better audio system, or the like.

The methods and systems described in this document and the referenced documents include many possible alternate combinations for the described methods and systems, such as wireless protocols and/or device-specific identifications. In an example, utilizing a device's MAC address, which is a standard unique identification assigned to every WiFi/WiMax adapter and Ethernet card (fixed—for facilitating a wired broadband internet connection) as a basis for a device-specific identification (DSI) or mobile end user identification (MEUI) in a wireless protocol is one alternative combination. In this example, another alternative may include the wireless protocol being based on Bluetooth, WUSB, UWB, and the like, instead of being based on WiFi/WiMax/Ethernet connection.

In the various embodiments of the methods and systems disclosed herein, various technologies may be employed. In certain preferred embodiments, the methods and systems disclosed herein identify and/or authenticate use of Internet-connected devices (mobile handsets—including cellular phones), PCs/laptops, television set-top boxes, televisions, and the like) using, primarily but not limited to, a variety of device-specific identification (DSI) types and techniques associated with various wireless protocols. This objective may be associated with WiFi and WiMax (both of which may utilize MAC addresses), WUSB (Wireless USB), UWB (Ultra-wide Band), Bluetooth (e.g. Bluetooth 3.0), and other forms of device-specific identifications. Other forms of DSI may not be derived from an identification associated with a wireless protocol.

The methods and systems herein may facilitate building privacy-sensitive and device-specific user identification and/or authentication profiles. The methods and systems may allow aggregation of various DSIs that belong to a number of different devices that may include any combination of devices (i.e. 1 mobile handset, 1 PC, 1 set-top box and 2 laptops OR 2 mobile handsets, 3 PCs, 1 laptops, etc.) and may tie it to specific users WITHOUT necessarily revealing a given user's "real world" identity (e.g. to non-affiliated third parties). A mobile handset's DSI is an example of a source of DSI used in the creation of identification/authentication profiles. The mobile handset's DSI may be the primary or base DSI associated with the identification/authentication profile. Other device DSIs may become associated with a profile based on usage from those devices being associated with the usernames/surfing habits associated with the mobile handset's DSI.

The methods and systems herein provide mechanisms that may transparently monitor the flow of device-specific or profile-specific information, such as a user-profile, while enabling a user's "real world" identity to be scrambled or encrypted (herein referred to as morphed) such that providers or facilitators who have access to the communications within the process would be not be capable of deriving the user's real world identity. Such morphing of real world identities may occur by creating unique algorithms that scramble a DSI or username-specific profile as the information associated with that profile is transferred from a partner's server (a partner may include but is not limited to internet search and content companies such as Google, MySpace, internet email sites such gmail.com or mail.yahoo.com, retail websites such as Amazon.com, and the like.)

User-specific identification and/or authentication profiles may be utilized for, but not limited to targeted advertising. Targeted advertising may include delivering targeted advertising across various media forms including but not limited to internet websites, television, internet television, outdoor advertising, mobile handset advertising, portable LCD-advertising, Internet radio, and the like. Mechanisms for delivering targeted advertisements across each media form may vary but may benefit from the core concepts of the methods and systems herein.

The methods and systems herein may facilitate creating content authentication and management systems or digital rights management systems using a mobile DSI, such as authenticating and managing access rights to and management of content (e.g. free content or content provided for a fee) and Internet software-as-a-service information content such as Lexis Nexus, Gartner, IDC, digital textbooks, and other digital media/digital information providers that grant conditional access (for payment, or otherwise).

In regards to digital rights management/content authentication, due to a mobile device's individual specific nature and its portability, a mobile DSI may provide a higher level of accuracy and flexibility than using a system in which access to content is tied to a particular PC/laptop, set-top box, and the like. The latter is a system that is commonly used in many current digital rights management schemes. Through the methods and systems herein described, a user may essentially carry all of his online digital rights with him as it is rooted in a DSI from his mobile handset. Although content may be exchanged with the user's mobile handset through other devices, (e.g. a set top box, PC/laptop, television, kiosk, external advertising device, and the like), the mobile handset DSI provides the means for authentication—independent of any other device in the content transfer chain. This is beneficial in that the other device(s) in the content transfer chain may have multiple users, may not be secure, may not support digital rights management and most importantly may be stationary in its location and thus not allowing the authenticated user to carry his digital rights with him. Make the comparison to a DVID? You bought it, you can take it with you. Not being able to do that for digital content is a step backwards, not forward. In such a system, if a user attempts to access a Mobile DSI-protected online account through a PC/laptop, or other internet-connected device, short distance communication would take place between the user's mobile handset and the internet-connected device at which point the user's mobile DSI would be passed to internet servers for authentication. The server at which the protected account exists may then attempt to match an entered username/password combination against a pre-registered mobile DSI. The username/password may be collected at the time a user's account is registered or at the time of an update/replacement of a mobile DSI for the user's account). If the username/password combination matches up with the mobile DSI, then the user will be granted access to the mobile DSI-protected account. If the mobile DSI does not match the username/password of the account, the user will not be granted access. Standard mechanisms for lost passwords or for resetting a password may also be applied, such as the use of pre-registered secret password questions.

Mobile handsets provide a variety of device-specific identification types on which a DSI may be based. A mobile handset that is WiFi or WiMax enabled will have a MAC address, this MAC address may serve as a DSI. A mobile handset that is Bluetooth-enabled will have a Bluetooth Device Address. This Bluetooth Device Address may serve as a DSI. A unique identification, potentially a serial code that identifies a mobile handset's central processing unit (CPU) may serve as a DSI. A unique identification, potentially a serial code, that identifies a mobile handset's WUSB (wireless USB) or UWB (Ultra Wide-band) chipset may serve as a DSI. A mobile telephone number that is used to dial a voice connection or send a TXT message to a mobile handset may serve as a DSI. GSM phones use the International Mobile Equipment Identity or IMEI that may serve as a DSI. CDMA phones use Mobile Equipment Identifiers or MEIDs that may serve as a DSI. Other similar device-specific identifications that are unique to a single physical mobile handset may serve as a mobile DSI.

When connected wired or wirelessly, PC/laptops may contribute device-specific information that may be used as a basis for a DSI. A PC/laptop that has a fixed wired connection via an Ethernet card will have a MAC address, this MAC address may serve as a DSI. A PC/laptop that is WiFi or WiMax enabled will have a MAC address, this MAC address may serve as a DSI. A PC/laptop that is Bluetooth-enabled will have a Bluetooth Device Address. This Bluetooth Device Address may serve as a DSI. A unique identification, potentially a serial code, which identifies a PC/laptop's central processing unit (CPU), may serve as a DSI. A unique identification, potentially a serial code, which identifies a PC/laptop's WUSB (wireless USB) or UWB (Ultra Wide-band) connection, may serve as a DSI.

Other consumer electronic devices that can be connected to an electronic network such as the Internet may also have DSI. If the consumer electronic device is capable of accessing an electronic network such as the Internet, it may do so using a wired Ethernet connection using a Ethernet card, or a wireless connection using a WiFi/WiMax connection, in both such scenarios, the device should have a MAC address that will be used as its DSI>. Examples of such consumer electronic devices capable of being connected to an electronic network include Television set-top boxes, Televisions, LCDs fixated outdoors, within retail stores, taxi cabs, other public transportation, Radio devices that are Internet-enabled, car radio devices that are Internet-enabled, and the like. These other consumer electronic devices may use many of the same or similar DSIs as mentioned above for mobile handsets or PCs/laptops including the MAC address as a DSI if its available.

The role of MAC addresses in Internet protocol v4 and v6 may require unique treatment. In Internet Protocol version 4, or IPv4, the IP Address of a given device is 32 bits long and is assigned without embedding the device's unique, permanent, MAC-address. However, In IPv6, the MAC-address of a device is intended to be embedded into a device's IP Address.

Public sources of information regarding the difference of the IPv6 address and its relevance to MAC-addresses describe IPv6 addresses as typically composed of two logical parts: a 64-bit sub-network prefix, and a 64-bit host part, which is either automatically generated from the interface's MAC address or assigned sequentially. Because the globally unique MAC addresses offer an opportunity to track user equipment, and so users, across time and IPv6 address changes, RFC 3041 (http://tools.ietf.org/html/rfc3041) was developed to reduce the prospect of user identity being permanently tied to an IPv6 address, thus restoring some of the possibilities of anonymity existing at IPv4. RFC 3041 (http://tools.ietforg/html/rfc3041) specifies a mechanism by which time-varying random bit strings can be used as interface circuit identifiers, replacing unchanging and traceable MAC addresses In IPv6, the possibility arises, that since the IP address includes the MAC address, that the IP address may become an easier and quicker way to derive a device-specific identification. The methods and systems herein support methodologies using IPv6 and IPv4. In particular an IPv6 IP Address or a MAC-address suited for IPv6 may facilitate determining and using a DSI. It is anticipated that while IPv4 is the popular standard today, a transition to IPv6 is imminent.

Targeted television advertising may be associated with personal devices, such as through mobile DSI-enabled identification or with mobile device internet browser cache/history content. Mobile DSI-enabled identification←what?. Advertisement targeting may be improved through the use of mobile DSI device detection within proximity of a front of a television. Mobile DSI, as herein described, may uniquely identify an individual through an association of a user profile with the Mobile DSI. By detecting a mobile device (through Mobile DSI detection) that is positioned within viewing distance of a television and identifying advertisements targeted to the user of the detected mobile device, the targeted advertisement may be presented to the television, or a set-top box controlling the television, and displayed for the user. The advertisement may be targeted based on a variety of factors associated with the mobile DSI including a user profile associated with the mobile DSI.

Advertisements may be targeted to and presented to a user based on the user's mobile DSI through a process that includes: gathering the device identifier or device-specific identification (DSI) from the user's mobile device, associating the gathered DSI with a user identity to provide a usage profile that may include usage tracking of content interaction through the mobile device and other internet enabled devices, using the usage profile to identify an advertisement or offer, determining which screen provides a good proximity to the user based on the relative distance of the user's mobile DSI device from a screen, and displaying the advertisement or offer on the screen.

Alternatively in the methods and systems, PC and/or laptops can have wired connections, whereas for mobile devices this is typically not the case. As such, referring to a wire connected PC/laptop MAC address is the equivalent of a wireless PC/Laptop/Mobile Handset's WiFi MAC address. As a result of such considerations, in the following described processes and diagrams, device-specific identifications, including those which are associated with wired or wireless technologies, are collectively referred to as DSIs.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method, comprising:
    collecting from a network-enabled device a MAC address of a personal mobile device, data representing user on-line activity related to an advertisement embedded in content presented via the network-enabled device while the personal mobile device is detected via a wireless communication to be in proximity to the network-enabled device, and an identifier of the network-enabled device, the MAC address of the personal mobile device being acquired by the network-enabled device via the wireless communication;
    analyzing, with a server, the collected user on-line activity to select an advertisement to suit a profile, wherein the profile is determined based on user activity associated with the MAC address of the personal mobile device;
    using the server to identify a stored profile based on the acquired MAC address;
    associating the collected data representing the user on-line activity of the network-enabled device and the network-enabled device identifier with the stored profile that was identified by the acquired MAC address, thereby associating the mobile device and the network-enabled device with a user represented by data in the stored profile; and
    in response to receiving an indication of the personal mobile device being in proximity to a network-enabled radio device, the indication resulting from the network-enabled radio device acquiring the MAC address of the personal mobile device via short distance wireless communication between the network-enabled radio device and the personal mobile device when the personal mobile device is in short distance wireless communication proximity to the network-enabled radio device, making the selected advertisement accessible to the server for presenting on the network enabled radio device.

2. The method of claim 1, wherein the personal mobile device is one of a mobile phone and a laptop.

3. The method of claim 1, wherein the wireless communication is selected from a list consisting of Bluetooth, WIFI, WiMax, WUSB, and UWB.

4. The method of claim 1, wherein the network-enabled device comprises a set-top box.

5. The method of claim 1, wherein the network-enabled device is an internet-connected gaming console.

6. The method of claim 1, wherein the network-enabled radio device is a car radio device.

7. A method, comprising:
    collecting from a network-enabled device a MAC address of a personal mobile device, data representing user online activity via the network-enabled device while the personal mobile device is detected via a wireless communication to be in proximity to the network-enabled device, and an identifier of the network-enabled device, the MAC address of the personal mobile device being acquired by the network-enabled device via the wireless communication;

using a server to identify a stored profile based on the collected MAC address;

associating the data representing the user on-line activity of the network enabled device and the network-enabled device identifier with the stored profile that was identified by the acquired MAC address, thereby associating the mobile device and the network-enabled device with a user represented by data in the stored profile;

analyzing, with the server, the data representing the user on-line activity of the network-enabled device to select an advertisement; and in response to receiving an indication of the personal mobile device being in proximity to a network-enabled radio device, making the selected advertisement accessible to the server for presenting on the network-enabled radio device.

8. The method of claim 7, wherein the indication of the personal mobile device being in proximity to the network-enabled radio device results from the network-enabled radio device acquiring the MAC address of the personal mobile device via short distance wireless communication between the network-enabled radio device and the personal mobile device when the personal mobile device is in short distance wireless communication proximity to the network-enabled radio device.

9. The method of claim 7, wherein the personal mobile device is a laptop.

10. The method of claim 7, wherein the network-enabled device comprises a set-top box.

11. The method of claim 7, wherein the network-enabled device is an internet-connected gaming console.

12. The method of claim 7, wherein the network-enabled radio device is a car radio device.

13. The method of claim 7, wherein the wireless communication is selected from a list consisting of Bluetooth, WIFI, WiMax, WUSB, and UWB.

14. A method, comprising:

collecting from a network-enabled device a MAC address of a personal mobile device, data representing user on-line activity of the network-enabled device while the personal mobile device is detected via WIFI wireless communication to be in proximity to the network-enabled device, and an identifier of the network-enabled device, the MAC address of the personal mobile device being acquired by the network-enabled device via the WIFI wireless communication;

using a server to identify a stored profile based on the collected MAC address;

associating the data representing the user on-line activity of the network enabled device and the network-enabled device identifier with the stored profile that was identified by the acquired MAC address, thereby associating the mobile device and the network-enabled device with a user represented by data in the stored profile;

analyzing, with the server, the data representing the user on-line activity of the network-enabled device to select an advertisement; and in response to receiving an indication of the personal mobile device being in proximity to a network-enabled radio device, making the selected advertisement accessible to the server for presenting on the personal mobile device.

15. The method of claim 14, wherein the indication of the personal mobile device being in proximity to the network-enabled radio device results from the network-enabled radio device acquiring the MAC address of the personal mobile device via short distance wireless communication between the network-enabled radio device and the personal mobile device when the personal mobile device is in short distance wireless communication proximity to the network-enabled radio device.

16. The method of claim 14, wherein the network-enabled device comprises a set-top box.

17. The method of claim 14, wherein the network-enabled radio device is a car radio device.

18. The method of claim 14, wherein the network-enabled device is a mobile phone.

* * * * *